US012631753B2

(12) United States Patent
Ortiz Egea

(10) Patent No.: US 12,631,753 B2
(45) Date of Patent: May 19, 2026

(54) DETERMINING PHASE ORDERS IN ToF IMAGING

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1421 days.

(21) Appl. No.: 17/170,494

(22) Filed: Feb. 8, 2021

(65) Prior Publication Data

US 2022/0252729 A1 Aug. 11, 2022

(51) Int. Cl.
 *G01C 3/08* (2006.01)
 *G01S 17/894* (2020.01)
(52) U.S. Cl.
 CPC .................................. *G01S 17/894* (2020.01)
(58) Field of Classification Search
 CPC ...... G01S 17/894; G01S 7/4915; G01S 7/493; G01S 17/36
 See application file for complete search history.

(56) References Cited

U.S. PATENT DOCUMENTS 10,795,021 B2 10/2020 Lamesch et al.

OTHER PUBLICATIONS

"International Search Report and Written Opinion Issued in PCT Application No. PCT/US22/013037", Mailed Date: Apr. 13, 2022, 13 Pages.
Communication pursuant to Article 94(3) EPC Received for European Application No. 22704068.0, mailed on Sep. 24, 2025, 09 pages.
Office Action Received for Taiwan Application No. 111100746, mailed on Dec. 8, 2025, 11 Pages. (English Translation is provided).

*Primary Examiner* — Samantha K Nickerson
(74) *Attorney, Agent, or Firm* — Alleman Hall LLP

(57) ABSTRACT

Examples are disclosed that relate to determining phase orders for phase data in a time-of-flight camera sensor, for use in unwrapping the phase data. One example provides a computing system comprising a depth sensor comprising a plurality of pixels, an illumination source, and a storage machine holding instructions executable by a logic machine to control the illumination source to output amplitude-modulated light at two or more modulation frequencies. The instructions are further executable to, for each pixel, make two or more phase measurements corresponding to different modulation frequencies, based at least on the two or more phase measurements, determine a series of phase order sets, determine a most likely phase order set by comparing the series of phase order sets to a line representing an evolution of phase with distance, and based on the most likely phase order set, determine a distance value associated with the pixel.

20 Claims, 17 Drawing Sheets

CONTROLLER 208

206

204

232

202

230

210

224

220

222

200

Phase (Radians)

Distance

PROBABILITY OF UNWRAPPING CORRECTLY

FIG. 9

PROBABILITY OF UNWRAPPING CORRECTLY

Figure 14:
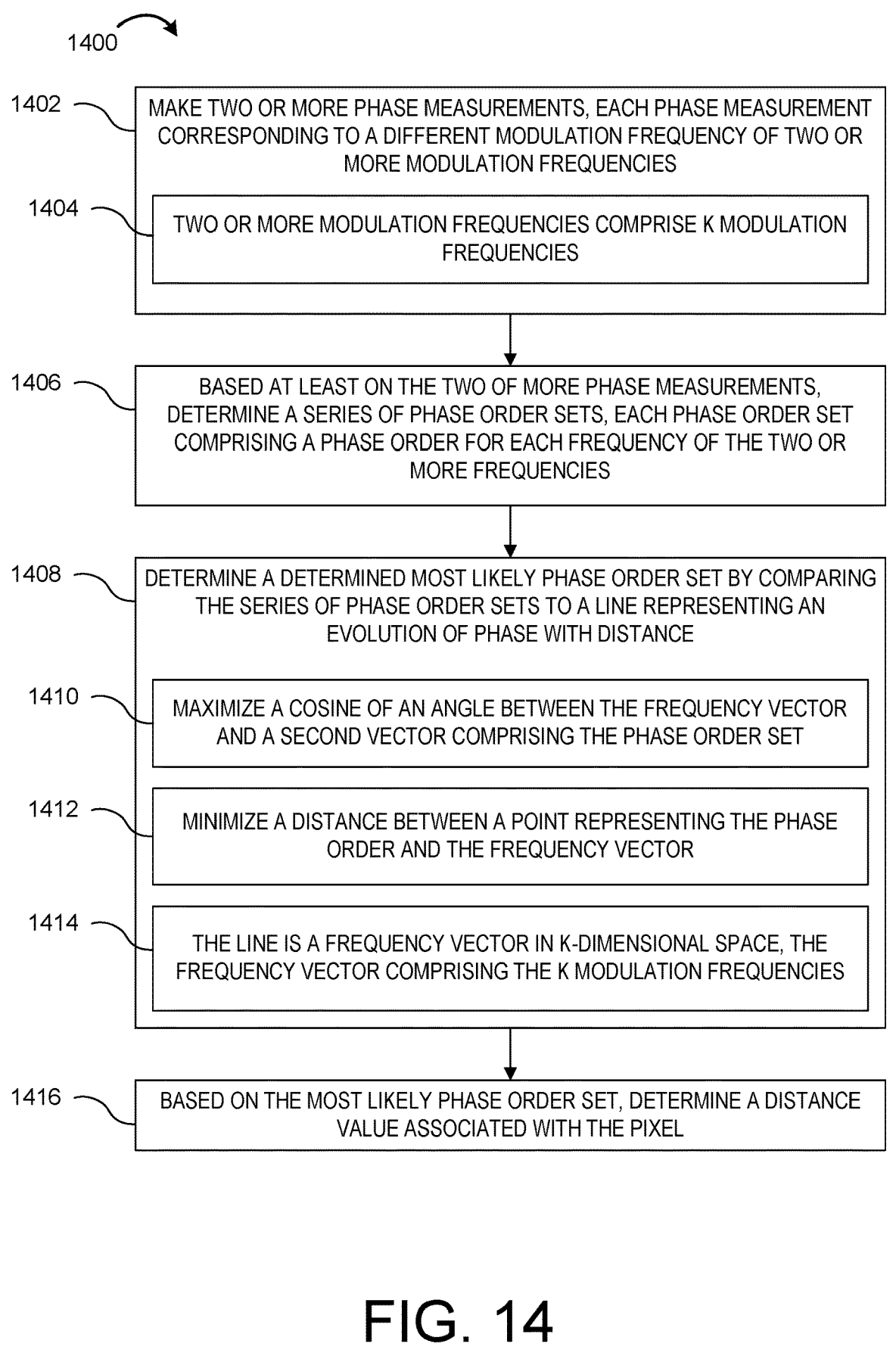

1402 — MAKE TWO OR MORE PHASE MEASUREMENTS, EACH PHASE MEASUREMENT CORRESPONDING TO A DIFFERENT MODULATION FREQUENCY OF TWO OR MORE MODULATION FREQUENCIES

1404 — TWO OR MORE MODULATION FREQUENCIES COMPRISE K MODULATION FREQUENCIES

1406 — BASED AT LEAST ON THE TWO OF MORE PHASE MEASUREMENTS, DETERMINE A SERIES OF PHASE ORDER SETS, EACH PHASE ORDER SET COMPRISING A PHASE ORDER FOR EACH FREQUENCY OF THE TWO OR MORE FREQUENCIES

1408 — DETERMINE A DETERMINED MOST LIKELY PHASE ORDER SET BY COMPARING THE SERIES OF PHASE ORDER SETS TO A LINE REPRESENTING AN EVOLUTION OF PHASE WITH DISTANCE

1410 — MAXIMIZE A COSINE OF AN ANGLE BETWEEN THE FREQUENCY VECTOR AND A SECOND VECTOR COMPRISING THE PHASE ORDER SET

1412 — MINIMIZE A DISTANCE BETWEEN A POINT REPRESENTING THE PHASE ORDER AND THE FREQUENCY VECTOR

1414 — THE LINE IS A FREQUENCY VECTOR IN K-DIMENSIONAL SPACE, THE FREQUENCY VECTOR COMPRISING THE K MODULATION FREQUENCIES

1416 — BASED ON THE MOST LIKELY PHASE ORDER SET, DETERMINE A DISTANCE VALUE ASSOCIATED WITH THE PIXEL

Figure 15:
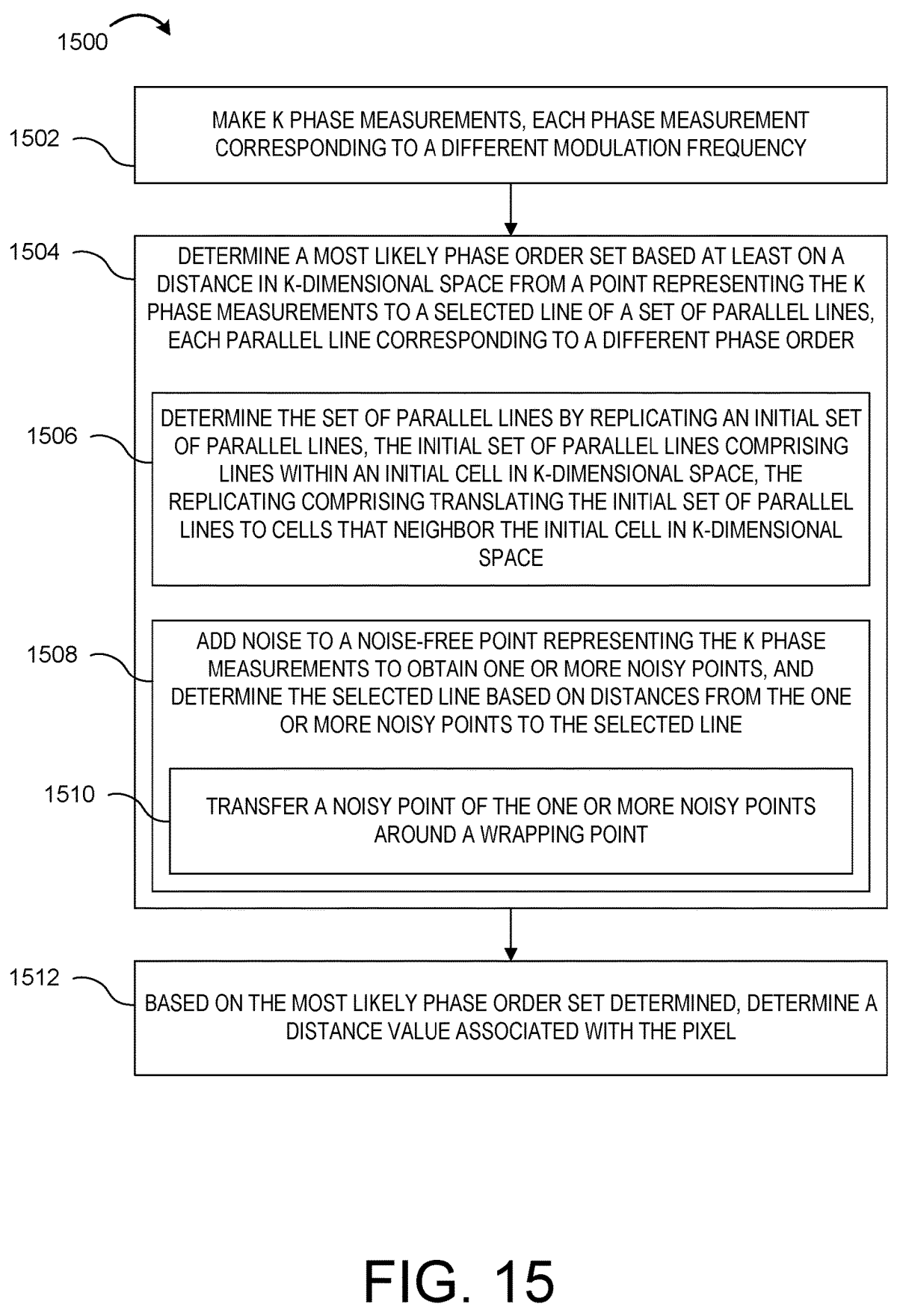

1502 — MAKE K PHASE MEASUREMENTS, EACH PHASE MEASUREMENT CORRESPONDING TO A DIFFERENT MODULATION FREQUENCY

1504 — DETERMINE A MOST LIKELY PHASE ORDER SET BASED AT LEAST ON A DISTANCE IN K-DIMENSIONAL SPACE FROM A POINT REPRESENTING THE K PHASE MEASUREMENTS TO A SELECTED LINE OF A SET OF PARALLEL LINES, EACH PARALLEL LINE CORRESPONDING TO A DIFFERENT PHASE ORDER

1506 — DETERMINE THE SET OF PARALLEL LINES BY REPLICATING AN INITIAL SET OF PARALLEL LINES, THE INITIAL SET OF PARALLEL LINES COMPRISING LINES WITHIN AN INITIAL CELL IN K-DIMENSIONAL SPACE, THE REPLICATING COMPRISING TRANSLATING THE INITIAL SET OF PARALLEL LINES TO CELLS THAT NEIGHBOR THE INITIAL CELL IN K-DIMENSIONAL SPACE

1508 — ADD NOISE TO A NOISE-FREE POINT REPRESENTING THE K PHASE MEASUREMENTS TO OBTAIN ONE OR MORE NOISY POINTS, AND DETERMINE THE SELECTED LINE BASED ON DISTANCES FROM THE ONE OR MORE NOISY POINTS TO THE SELECTED LINE

1510 — TRANSFER A NOISY POINT OF THE ONE OR MORE NOISY POINTS AROUND A WRAPPING POINT

1512 — BASED ON THE MOST LIKELY PHASE ORDER SET DETERMINED, DETERMINE A DISTANCE VALUE ASSOCIATED WITH THE PIXEL

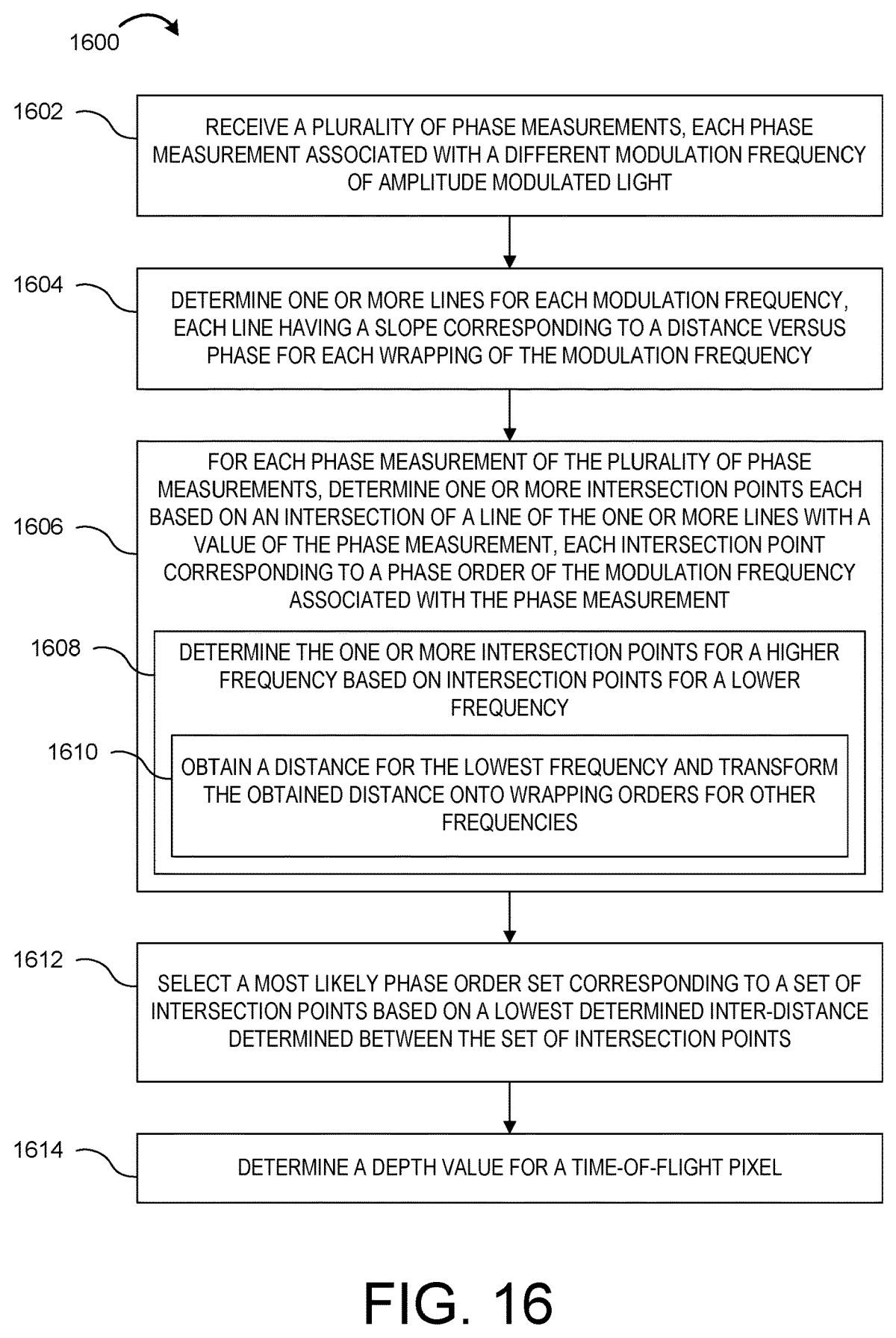

1602 — RECEIVE A PLURALITY OF PHASE MEASUREMENTS, EACH PHASE MEASUREMENT ASSOCIATED WITH A DIFFERENT MODULATION FREQUENCY OF AMPLITUDE MODULATED LIGHT

1604 — DETERMINE ONE OR MORE LINES FOR EACH MODULATION FREQUENCY, EACH LINE HAVING A SLOPE CORRESPONDING TO A DISTANCE VERSUS PHASE FOR EACH WRAPPING OF THE MODULATION FREQUENCY

1606 — FOR EACH PHASE MEASUREMENT OF THE PLURALITY OF PHASE MEASUREMENTS, DETERMINE ONE OR MORE INTERSECTION POINTS EACH BASED ON AN INTERSECTION OF A LINE OF THE ONE OR MORE LINES WITH A VALUE OF THE PHASE MEASUREMENT, EACH INTERSECTION POINT CORRESPONDING TO A PHASE ORDER OF THE MODULATION FREQUENCY ASSOCIATED WITH THE PHASE MEASUREMENT

1608 — DETERMINE THE ONE OR MORE INTERSECTION POINTS FOR A HIGHER FREQUENCY BASED ON INTERSECTION POINTS FOR A LOWER FREQUENCY

1610 — OBTAIN A DISTANCE FOR THE LOWEST FREQUENCY AND TRANSFORM THE OBTAINED DISTANCE ONTO WRAPPING ORDERS FOR OTHER FREQUENCIES

1612 — SELECT A MOST LIKELY PHASE ORDER SET CORRESPONDING TO A SET OF INTERSECTION POINTS BASED ON A LOWEST DETERMINED INTER-DISTANCE DETERMINED BETWEEN THE SET OF INTERSECTION POINTS

1614 — DETERMINE A DEPTH VALUE FOR A TIME-OF-FLIGHT PIXEL

FIG. 16

DETERMINING PHASE ORDERS IN ToF IMAGING

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which light emitted by the imaging system travels out to that point and then returns back to a sensor of the imaging system.

SUMMARY

Examples are disclosed that relate to determining phase orders for phase data in a time-of-flight camera sensor for use in unwrapping the phase data. One example provides a computing system comprising a depth sensor comprising a plurality of pixels, each pixel configured to sense light, and an illumination source configured to output light. The computing system further comprises a logic machine and a storage machine holding instructions executable by the logic machine to control the illumination source to output amplitude-modulated light at two or more modulation frequencies and, for each pixel of the plurality of pixels, make two or more phase measurements, each phase measurement corresponding to a different modulation frequency of the two or more modulation frequencies. The instructions are further executable to, based at least on the two or more phase measurements, determine a series of phase order sets, each phase order set comprising a phase order for each frequency of the two or more frequencies, determine a most likely phase order set by comparing the series of phase order sets to a line representing an evolution of phase with distance, and based on the most likely phase order set, determine a distance value associated with the pixel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 shows the performance of example algorithms utilizing the analytical approach of FIG. 5 and the stochastic approach of FIG. 6 compared to a look-up table approach.

FIG. 11 shows the performance of an example implementation of the approach depicted in FIG. 10.

FIG. 14 is a flow diagram of an example method for determining a depth value for a ToF pixel based upon a plurality of phase measurements.

FIG. 15 is a flow diagram of another example method for determining a depth value for a ToF pixel based upon a plurality of phase measurements.

FIG. 16 is a flow diagram of another example method for determining a depth value for a ToF pixel based upon a plurality of phase measurements.

DETAILED DESCRIPTION

'Phase-based' optical ToF imaging is a variant of ToF imaging in which depth is computed based on the phase shift of amplitude modulated light reflected back from a subject. The phase shift is proportional to the subject's distance modulo the wavelength of the modulation frequency.

However, due to the periodic nature of the modulated light, the measured total phase repeats (or wraps) every $2\pi$. For example, given a measured phase $\tilde{\phi}_k$, the total phase is $\tilde{\phi}_k + 2\pi n_k$, where $n_k$ is an integer. Since $n_k$ cannot be directly measured via a phase based ToF pixel, the total phase, and thus the actual distance related to the measurement, is ambiguous. As the measured phase ranges from 0 to $2\pi$, the range of unambiguity in the determined distance is from 0 to $$\frac{c}{2f}.$$

To address this issue, two or more different modulation frequencies k can be used to increase the range of unambiguity, allowing the phase information to be "unwrapped" for the accurate determination of distance. Phase unwrapping, or 'de-aliasing,' is a way to disambiguate the phase shift data and identify a distance value by illuminating the scene with amplitude-modulated light of a plurality of different frequencies, as the distance ambiguities are different for each frequency of illumination light. This extends the unambiguity range to a distance corresponding to a common beat frequency for all frequencies used.

However, due to noise in the measured phases, the phase unwrapping computation may not be straightforward. Accordingly, examples are disclosed relating to determining a most likely phase order set and associated depth value for a pixel given a plurality of noisy phase measurements corresponding to different modulation frequencies. Briefly, due to noise, the phase number $n_k$ (the number of the phase wrapping) for a measurement made at a modulation frequency k may be uncertain. Thus, the disclosed examples utilize graphical methods based on an optimization of observed phase measurements compared to lines representing phase and distance relationships for the utilized frequencies. The examples of graphical methods disclosed herein may achieve improved efficiency with fast computation and low memory usage. Further, the disclosed examples may utilize fast operations on processors (e.g., multiplication and sorting) while avoiding interpolations.

Figure 1:
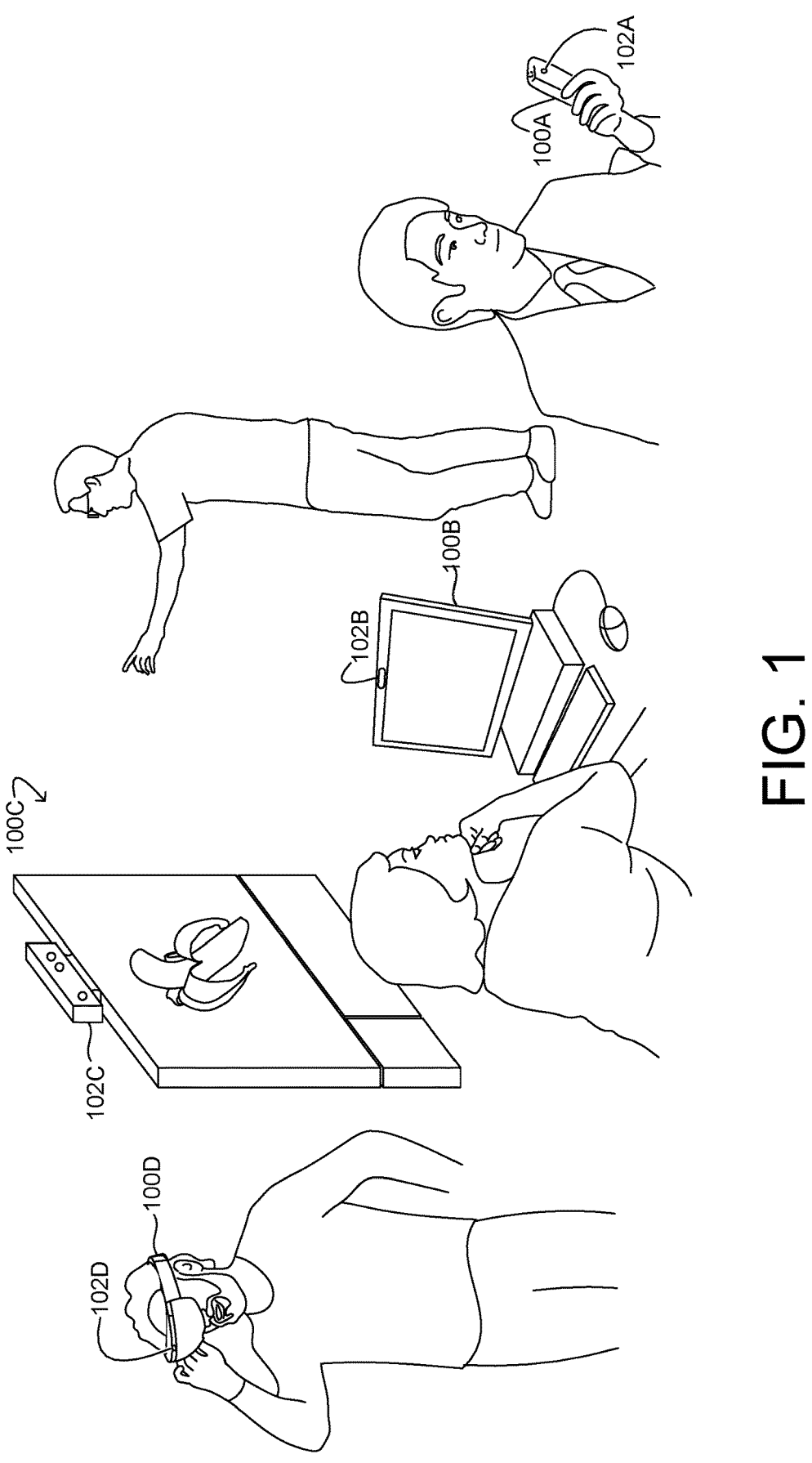
FIG. 1 shows aspects of example electronic devices comprising ToF cameras.

Prior to discussing these examples in detail, FIG. 1 illustrates various different example electronic devices 100A-D that may employ phase-based ToF depth imaging systems. Device 100A is a smartphone that includes a camera 102A. Device 100B is a personal computer that includes a web camera 102B. Device 100C is a video game system that includes a peripheral 3D camera 102C. Device 100D is a virtual-reality headset that includes a 3D camera 102D. Devices 100A-D may employ phase-based optical ToF imaging in industrial and/or consumer applications, including device automation applications, gaming and virtual reality applications, and biometric and facial recognition applications. It will also be appreciated that phase-based ToF depth imaging may be used in any other suitable electronic device.

Figure 2:
FIG. 2 shows aspects of an example ToF camera system.

FIG. 2 shows a schematic depiction of an example phase-based ToF depth imaging system 200 including a ToF camera 202. ToF 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image of subject 222 and/or the environment. Controller 208 may comprise software, programs, and/or executable instructions to perform phase unwrapping, examples of which are described below. In some examples, controller 208 may be implemented across one or more computing devices, aspects of which are described in more detail below with reference to FIG. 17.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to image light from modulated light emitter 230 as reflected off surface 220 and back to the camera. Each ToF pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped via the examples described herein to obtain a depth value for each pixel.

Figure 3:
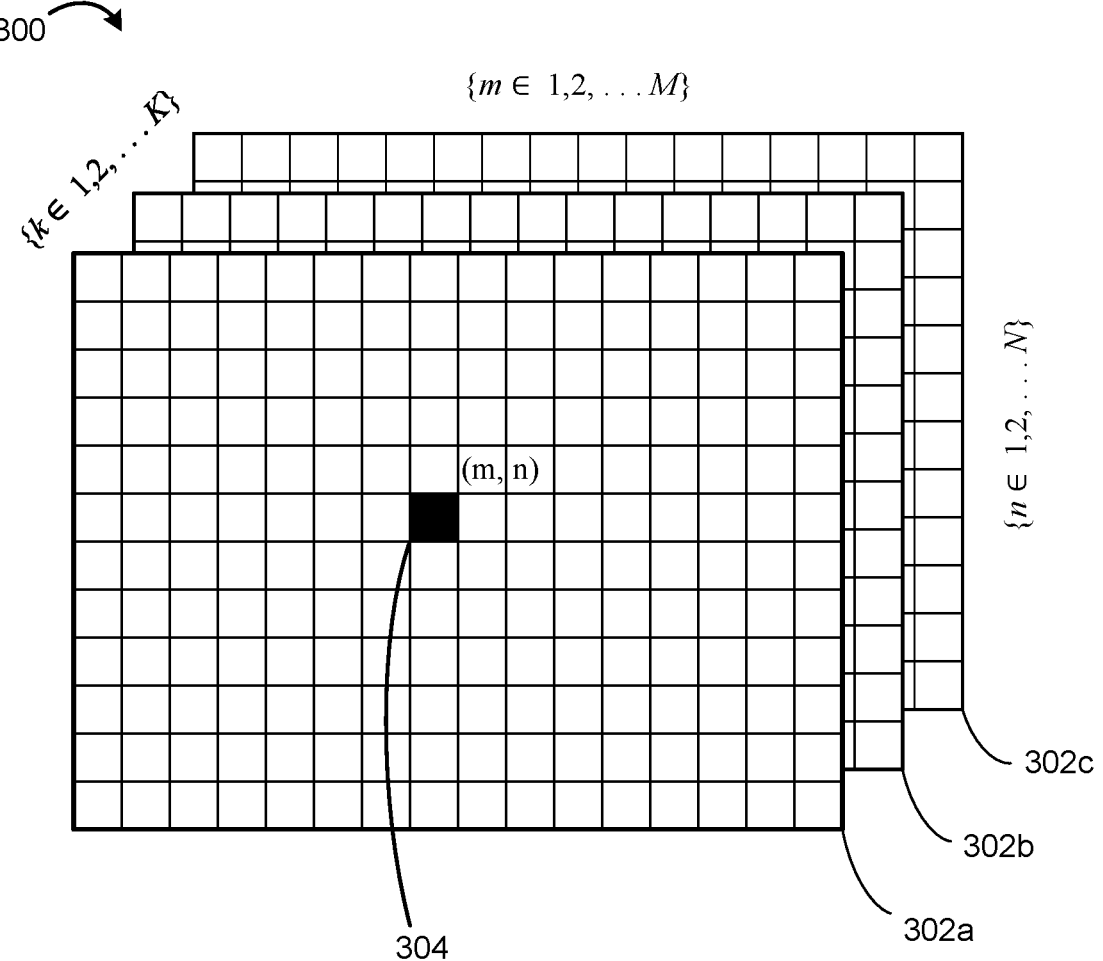
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. For example, the experimental signal $\tilde{S}_k$ collected by pixel 304 at (m, n) is represented by $$\tilde{S}_k(m, n) = \tilde{A}_k(m, n)e^{i\tilde{\phi}_k(m,n)} \qquad \text{Eq. 1}$$

where $\tilde{\phi}_k$ is the phase, $\{m \in 1, 2 \ldots, M\}$, $\{n \in 1, 2 \ldots, N\}$, and $\{k \in 1, 2, \ldots, K\}$. A tilde accent over a variable indicates that the variable has been obtained and/or calculated experimentally, while the absence of a tilde accent indicates variables that correspond to a noise-free situation.

As the disclosed examples operate on a pixel-by-pixel basis, the (m, n) notation will be omitted going forward for simplicity. The terms "distance" and "depth value" may be used interchangeably when referring to the output value of a pixel. While various examples are described in the context of three light modulation frequencies, any number of frequencies $K \geq 2$ can be used.

The phase of the complex signal $\tilde{\phi}_k$ may be computed as $$\tilde{\phi}_k = \arctan2\left(\tilde{S}_k^i, \tilde{S}_k^r\right) \qquad \text{Eq. 2}$$

where $$\tilde{S}_k^i$$

is the imaginary part of the signal collected for frequency k and $$\tilde{S}_k^r$$

is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. At the sensor, the relationship between the total phase φ of the amplitude modulated light and the travelled distance is proportional to the modulation frequency of the light, as given by Equation 3:

$$\phi = \frac{4\pi df}{c}$$ Eq. 3 where d is the distance, f is the modulation frequency, and c is the speed of light. Due to the periodic nature of the modulated light, the measured total phase repeats (or wraps) every $2\pi$. For example, given a measured phase $\tilde{\phi}_k$, the total phase is $\tilde{\phi}_k + 2\pi n_k$, where $n_k$ is an integer. Since $n_k$ cannot be directly measured via a phase based ToF pixel, the total phase is ambiguous. As the measured phase ranges from 0 to $2\pi$, the range of unambiguity in the determined distance is from 0 to $$\frac{c}{2f}.$$

Distances less than $$\frac{c}{2f}$$

can be determined without ambiguity, whereas distances beyond this range cannot be determined without additional information. As such, higher frequencies will have a shorter range of unambiguity.

Figure 4:
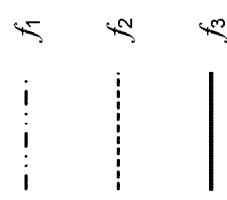
FIG. 4 depicts a linear relationship between phase and distance for an example signal set comprising phase measurements for each of three different modulation frequencies.

FIG. 4 depicts a linear relationship between phase and distance for three frequencies of amplitude modulated light. For a given frequency, when the total phase increases beyond $2\pi$, the measured phase "wraps" around to 0. For a single frequency f, the range of unambiguity, $$\frac{c}{2f},$$

is the distance to the first wrap point. The phase order of the total phase is the number of times the phase wraps around. For example, line 402 corresponds to the phase in the zeroth phase order of frequency $f_1$. Likewise, lines 404 and 406 correspond to the first and second phase orders of frequency $f_1$.

The modulation frequency of the illumination light imposes a linear variation in precision of a phase measurement. Linear variations on the estimation of the phase lead to variations in the depth value depending on frequency. Rearranging Eq. 3 above to solve for distance results in:

$$\vec{d} \sim d_k = \frac{c(\tilde{\phi}_k + 2\pi n_k)}{4\pi f_k}$$ Eq. 4 where $\tilde{\phi}_k$ is the measured noisy phase of modulation frequency $f_k$ and $n_k$ is the phase order. Here, $\vec{d}$ is the distance in the ideal noise-free case and/or represents a most likely distance, which may be a weighted average of two or more noisy $d$ values, as described below. As seen in Eq. 4, the error in distance $\tilde{d}$ depends on the error of the measured

6 phase $\tilde{\phi}_k$, and is inversely proportional to the frequency. As such, higher frequencies typically correspond to smaller errors. This can be seen in FIG. 4, as an error in the phase corresponds to a relatively smaller error in distance when the slope is relatively steep (e.g., $f_1$ in FIG. 4). Thus, while higher frequencies reduce the range of unambiguity compared to lower frequencies (e.g., $f_3$ in FIG. 4), higher frequencies are also associated with greater errors in the depth value.

Accordingly, a set of K≥2 modulation frequencies k can be used to increase the range of unambiguity, allowing the phase information to be "unwrapped" for the accurate determination of distance. Phase unwrapping, or 'de-aliasing,' is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f} = \{f_1, f_2, \ldots f_K\}$. The collection of frequencies comprises frequencies that are chosen to wrap at different locations in the unambiguity range (see FIG. 4), which extends from distance zero in FIG. 4 to the point at the far-right side of the depicted graph, where all three frequencies wrap at a common location.

In an ideal error-free scenario, the depicted combination of three measured phases will correspond to a unique depth value within the unambiguity range. However, due to noise in the measured phases, the phase unwrapping computation may not be straightforward. Accordingly, examples are disclosed relating to determining a most likely phase order set and associated depth value for a pixel given a plurality of noisy phase measurements corresponding to different modulation frequencies. Briefly, due to noise, the phase number $n_k$ (the number of the phase wrapping) for a measurement made at a modulation frequency k may be uncertain. The unwrapping process to obtain the most likely phase order set ($\vec{n} = \{n_1, n_2, \ldots, n_K\}$) is based on a minimization of the distance regarding to intersection points of straight lines that relate the distance with the phase. The term "minimization" as used herein indicates a determined minimum reached by a computational process, which may not be an actual local or global minimum. In one example, a most likely phase order set is determined based on distances between points representing phase measurements at different phase orders and a line representing the evolution of phase with distance. The depth value of the pixel is determined based on the determined most likely phase order set. In another example, a series of lines representing the evolution of phase at different phase order sets is compared to a point representing the phase measurements. A line is selected based on the distance from the point to the line, and the phase order set associated with the selected line then used to determine the depth value of the pixel. The examples disclosed herein may achieve improved efficiency with fast computation and low memory usage, with similar performance compared to other methods. Further, the disclosed examples may utilize fast operations on processors (e.g., multiplication and sorting) while avoiding interpolations.

In the absence of noise, the determined distance ideally would same for each frequency $f_k$ (see Eq. 4). For example, in the example scenario in FIG. 4, the distance 410 intersects (at intersection point 412) with the tenth line segment, or ninth wrapping, of frequency $f_1$. Thus, the phase order for this frequency is $n_1 = 9$. Similarly, $n_2 = 6$, $n_3 = 1$, and the phase order set corresponding to distance 410 is $\vec{n}=\{9,6,1\}$. However, as discussed above, the precision varies due to noise. Accordingly, the disclosed examples find a determined most likely phase order set for noisy phase measurements. Referring again to FIG. 4, the phases of each light modulation frequency evolve linearly with distance, with a slope of each line being proportional to the corresponding frequency. As such, in a first example implementation, the evolution of phase is represented as a straight line in K-dimensional space:

$$R \equiv \vec{\phi}_0 + t\hat{f} \qquad \text{Eq. 5}$$

where t is a parameter corresponding to the distance, $\hat{f}$ is the slope, $\vec{\phi}_0$ is the initial phase, and $\vec{r}_0$ is the starting point. The line is a model line corresponding to the ideal phase in the absence of noise. Equation 3 suggests the phase begins at 0. With this assumption, $\vec{\phi}_0=\vec{0}$ and the equation is simplified to:

$$R \equiv t\hat{f} \qquad \text{Eq. 6}$$

where R is the line.

Figure 5:
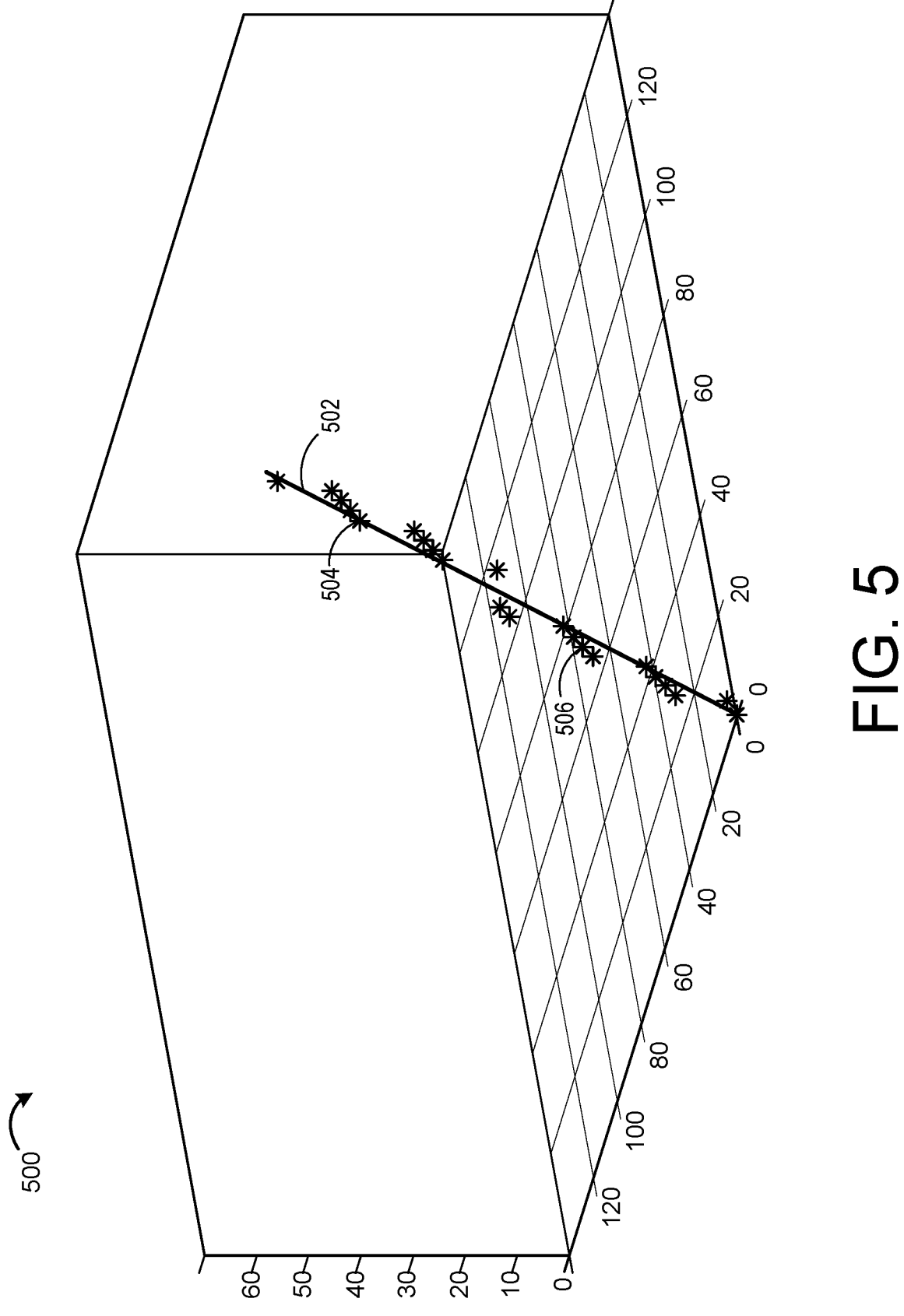
FIG. 5 shows a graph depicting a line depicting the evolution of phase with distance for a set of ToF phase measurements at three different modulation frequencies, and a series of total phase triplets representing possible unwrapping solutions obtained using an example analytical process.

FIG. 5 shows a graph 500 in 3-dimensional space for a line according to Eq. 6. In this example, line 502 has slope corresponding to three modulation frequencies: 54, 189, and 198 MHz. Other examples may use different frequencies. The total phase for each modulation frequency is represented on the x, y, and z axes while the length of the line (from the origin) corresponds to the distance parameter (see Eq. 6).

To perform unwrapping, a series of phase order sets can be calculated, from which a most likely phase order set is selected to solve for distance. In one example, elements of a phase order set $\vec{n}^l$, starting from the total phase (collected phase+phase order) of a given frequency, are determined via an analytical method, as follows. Let $\vec{\phi}$ be the collected phase vector corresponding to the frequency vector $\vec{f}$ (such that each $\tilde{\phi}_k$ corresponds to a different modulation frequency $f_k$). The total phase is calculated as $$\left(\tilde{\phi}_k + 2\pi n_k^l\right)$$

for the frequency $f_k$. Then, the phase orders of other elements of the set $$n_k^i$$

are evaluated by:

$$n_i = \text{round}\left[\frac{\left|\left(\tilde{\phi}k + 2\pi n_k^l\right)\frac{f_i}{f_k}\tilde{\phi}i\right|}{2\pi}\right] \text{ with } i \neq k \qquad \text{Eq. 7}$$

where $n_i$ is the phase order corresponding to collected phase $\tilde{\phi}_i$ and frequency $f_i$.

For example, let frequency vector $\vec{f}=\{198, 189, 54\}$ MHz, as illustrated in FIG. 5, and collected phase vector $\vec{\phi}=\{0.0538, 0.1834, -0.2259\}$. The collected phase vector can be decomposed for the range of unambiguity as $\vec{f}=a\vec{m}$, where a is the greatest common divisor (gcd) of the frequency vector, and also the beat frequency that determines the range of unambiguity. Further, $\vec{m}$ is the coprime frequency vector. In this example, a=9 and $\vec{m}=\{22, 21, 6\}$. For reducing an amount of error in the calculation of $n_i$ due to sensor noise, a highest frequency can be selected. In this case, there are 22 possible values $$n_1^l$$

$\in\{0, 1, \ldots, 21\}$ that the phase orders can take ($\vec{N}=\{\vec{n}^1, n^2, \ldots \vec{n}^{22}\}$). The set $\vec{n}^l$, with l=2, takes the form $\vec{n}^2=\{2, 2, 1\}$. FIG. 5 shows the total phase of 22 triplets (two of which are indicated as triplets 504 and 506) obtained via Eq. 7.

Equation 7 provides for the changing frequencies temporally or spatially by adding or subtracting, without any need for memory. Where the modulation frequencies are co-prime, then the space of the solution can be relatively large. However, in practice, the space of the solution may be constrained by architectural factors, such as an intensity of returning light signal. The solution space may also be constrained by the election of frequencies that are not co-prime, providing a determined range of unambiguity, as in the example in FIG. 4.

In another example, a stochastic method can be used to calculate phase order sets that are most likely to be produced by the data $\vec{N}=\{\vec{n}^1\vec{n}^2, \ldots \vec{n}^L\}$. In one example employing a stochastic method, a range of interest is fine sampled, and the phase vectors ($\vec{\phi}(d)$) are provided via Eq. 3. The range of interest can comprise any subset up to and including the full range of unambiguity. Once the reference phase vector ($\vec{\phi}(d)$) is provided for every point of the interval, random noise, compatible with noise generated by the image sensor, is added to generate a noisy phase vector $\vec{\phi}(d)$. The noise generated may comprise anisotropic noise (variance dependent of frequency) or isotropic noise (variance independent of frequency). The phase order vectors $\vec{n}^l$ are calculated as a floor:

$$\vec{n}^l = \text{floor}\left[\frac{\vec{\phi}(d)}{2\pi}\right] \qquad \text{Eq. 8}$$

where the floor function outputs the greatest integer less than or equal to a value. The procedure may be repeated a suitable number of times to check possible combinations of phase orders. Unique phase orders may be selected for the phase order sets $\vec{N}$.

Figure 6:
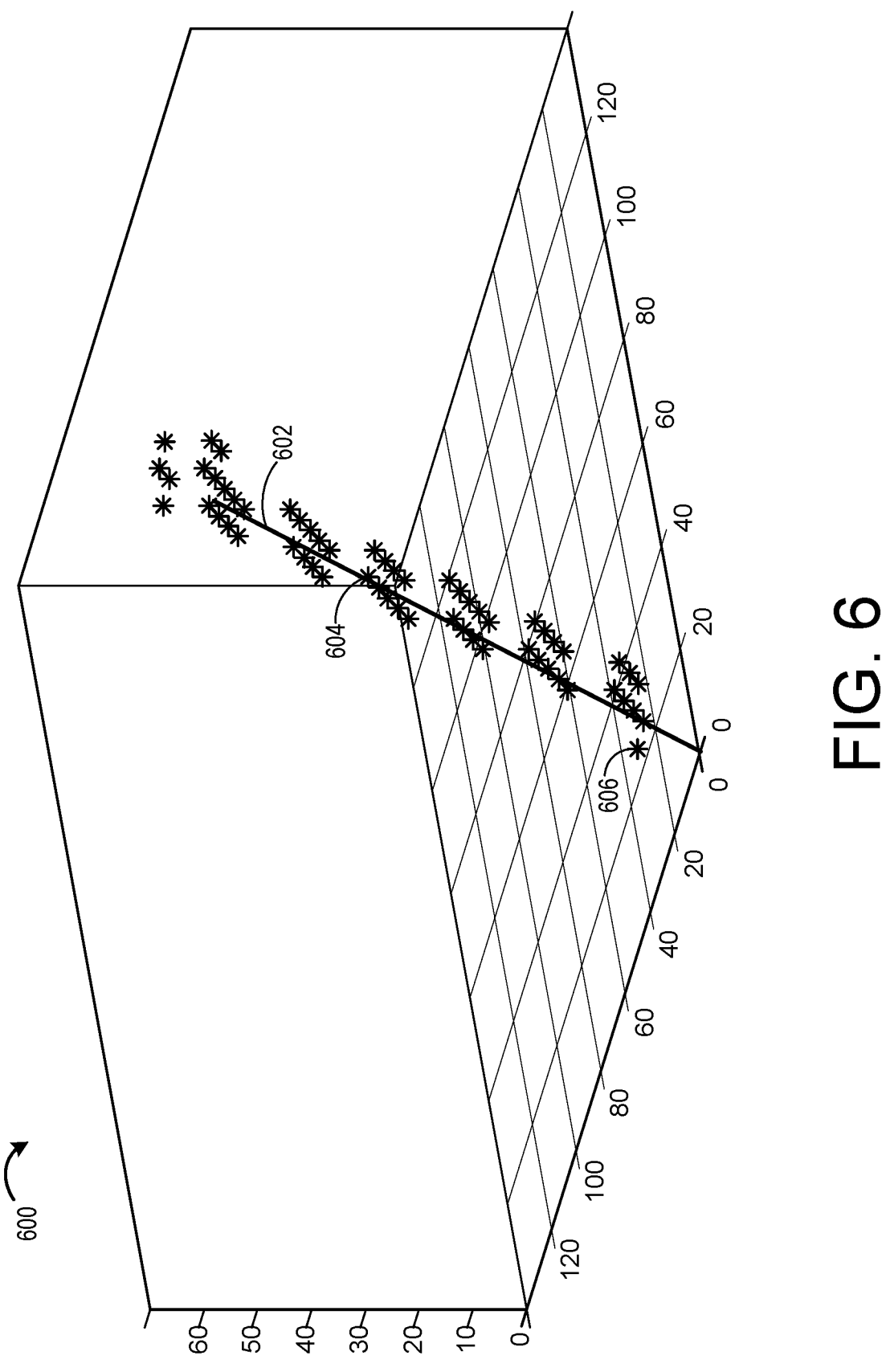
FIG. 6 shows the line of FIG. 5, and illustrates a series of total phase triplets obtained using an example stochastic process.

FIG. 6 shows a graph 600 depicting an example series of 59 total phase triplets resulting from such a stochastic method. The series of total phase triplets in FIG. 6 are generated from an initial set, such as the set of 22 total phase triplets in FIG. 5. In the example depicted in FIG. 6, the unambiguity range was sampled every 1 mm, and Gaussian isotropic noise was added with variance 0.01 rad$^2$. Within each distance interval, 10,000 noisy phase vectors were generated, from which phase order vectors were calculated, resulting in 59 vectors $\vec{N}=\{\vec{n}^1, \vec{n}^2, \ldots \vec{n}^{59}\}$. Other examples may generate phase vector sets using different values.

Figure 7:
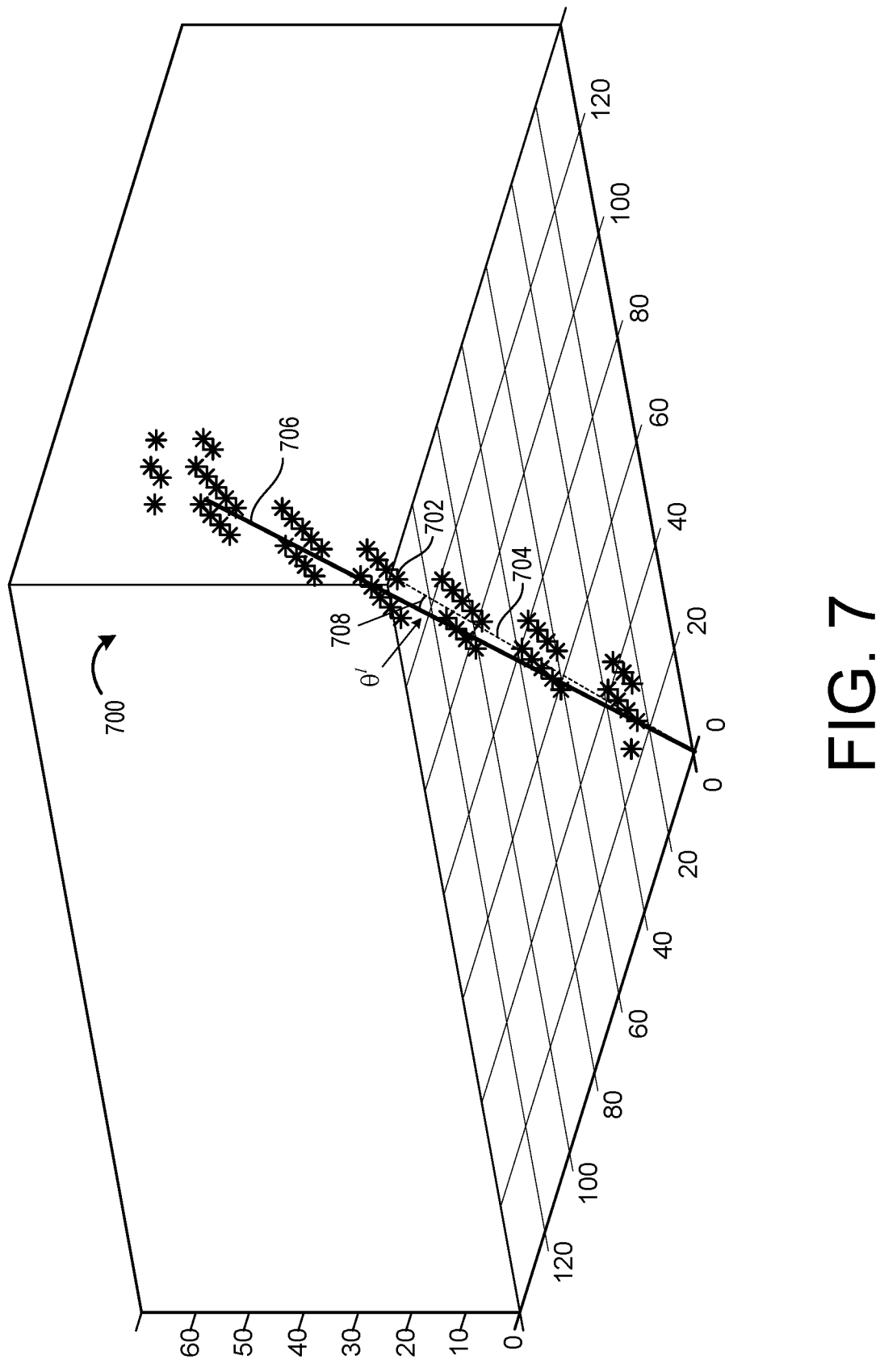
FIG. 7 shows the line and total phase triplets from FIG. 6, and illustrates an example selection of a most likely phase order set by maximizing a cosine of an angle between a phase order vector and a line.

After generation of a suitable number of phase order sets using either an analytical method or stochastic method, such as the examples described above, a determined mostly likely phase order set $\vec{n}^l$ is selected using an error function. For example, the phase order set that produces the smallest error according to the error function, may be selected as the most likely phase order set. Any suitable error function may be used to evaluate the phase order sets. As one example, a cosine function can be used as an error function. FIG. 7 shows the 59 total phase triplets of FIG. 6 that were generated stochastically. Each point within set 700 represents a total phase that corresponds to a measured phase and a unique phase order set. For example, the total phase of a K-dimensional noisy point 702 is given by $$\left(\vec{\phi}^l + 2\pi n_j^l\right).$$

A vector is evaluated for each noisy point, and a cosine error function is used to identify a vector that is determined to most closely matches the line. The phase order set associated with the vector is then selected as the most likely phase order set of the phase order sets considered.

For example, consider noisy point 702 of set 700. A vector that extends from the starting point ($\vec{\phi}_0$) of the line to the total phase of the collected sample ($\vec{\phi}'=\vec{\phi}+2\pi\vec{n}^l-\vec{\phi}_0$) is shown as a dashed line 704. Dashed line 704 is compared to the slope of the frequencies $\hat{f}$ (slope of line 706) to determine an angle 708 ($\theta^l$). The cosine may be determined according to:

$$\cos\theta^l = \frac{\vec{\phi}^l \hat{f}}{\|\vec{\phi}\|}$$ Eq. 9 where $\|\vec{\phi}^l\|$ is the norm of the noisy phase vector. Each point within the set of points is evaluated via Eq. 9. The maximum of the cosine provides the minimum angle of the points considered. As such, the maximum of the vector $\overrightarrow{\cos\theta}$ provides the closest solution to the line, and the corresponding point provides the index of the most likely phase vector $\vec{n}^l$. For example, if noisy point 702 provides the vector which maximizes the cosine of angle 708 according to Eq. 9, then the phase order set associated with noisy point 702 is selected as the most likely phase order set of the phase order sets considered.

After selecting a most likely set $\vec{n}^l$ via the cosine function, a determined optimal distance $\bar{d}$ can be assessed as the weighted sum of the projected phase of the total phase $\vec{\phi}^l$ by the square of the norm of the frequency vector, and is calculated according to:

$$\bar{d} = \sum_{k=1}^{K} \vec{\phi}(k)\frac{f^2(k)}{\|\vec{f}\|^2}$$ Eq. 10 where the weighting factor $$\frac{f^2(k)}{\|\vec{f}\|^2}$$

is the square norm of the frequency vector. The term "optimal" as used herein refers to a distance determined based upon a minimization/optimization process, and may not correspond to a global or local optimum.

Figure 8:
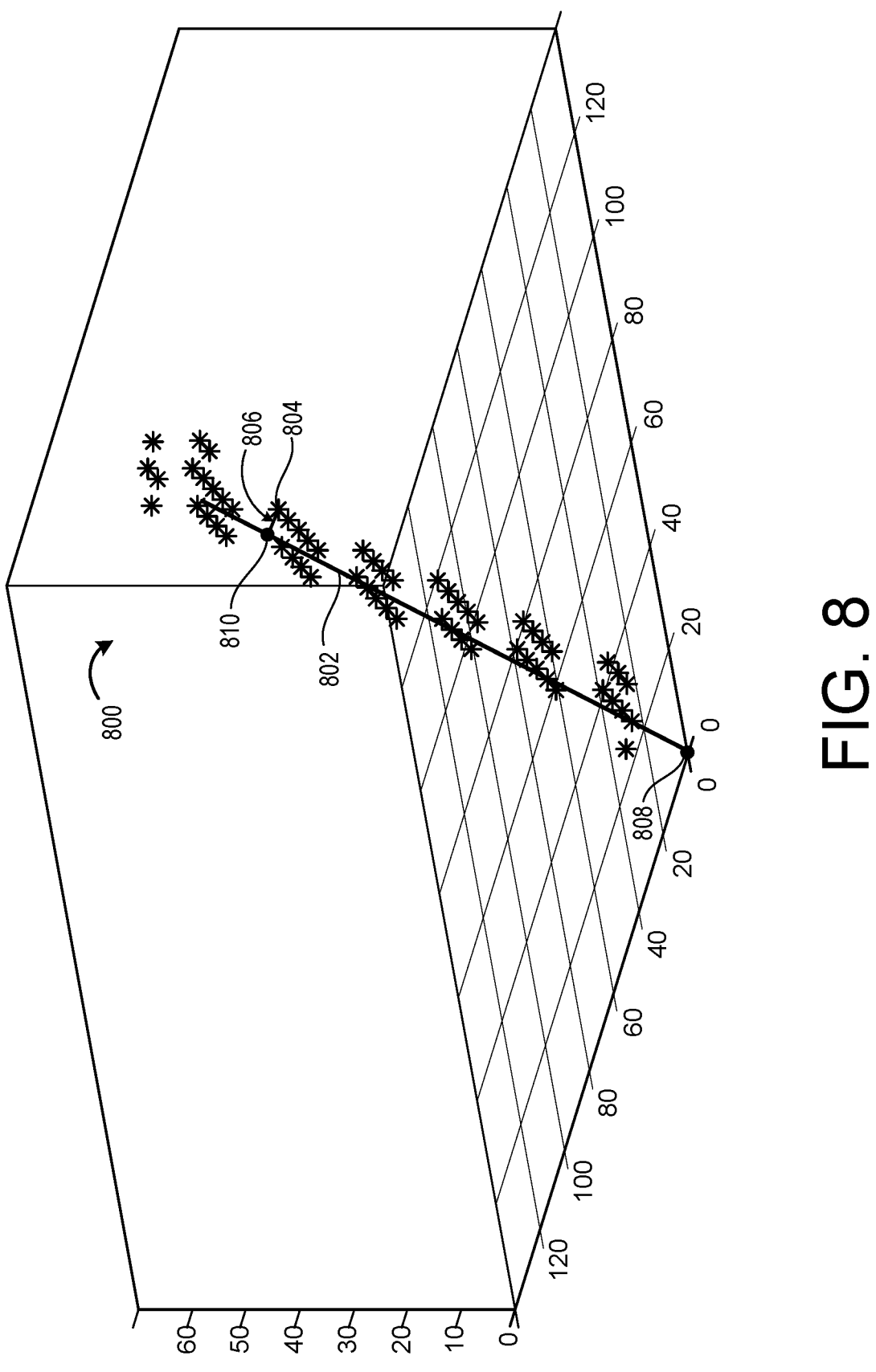
FIG. 8 shows an example selection of a most likely phase order set by minimizing a distance between a projected phase point and a line.

In a second example implementation, distance can be used as an error function, such that a most likely phase order set is selected based on a shortest distance between a total phase point and a line. In this implementation, a distance minimization is performed to obtain a determined minimum distance from the point to the line. FIG. 8 shows an example of selecting a most likely phase order set by minimizing a distance between a noisy point and the line. The graph in FIG. 8 shows a line 802 with a set 800 of noisy points corresponding to possible phase order sets. Set 800 may be generated with stochastic method described above, for example. In other examples, phase order points can be generated by an analytical process. A minimum distance may be found for each noisy point of the collection of noisy points. For example, a distance minimization may be performed for noisy point 804 to obtain minimum distance 806.

In some examples, minimization can be performed using a least squares method by minimizing the square of the Euclidean distance between the point and the line. The square of the distance is:

$$D^{l2} = \left\|\vec{\phi}^l - t^l \hat{f}\right\|^2$$ Eq. 11 where $\vec{\phi}^l$ is the noisy point and $t^l$ is the distance from the starting point $\vec{r}_0$ to the projected point on the line. The minimization may be performed as the derivative of the Euclidean distance regarding to the parameter $t^l$ by:

$$\frac{dD^{l2}}{dt^l} = 0$$ Eq. 12 which leads to:

$$t^l = \vec{\phi}^l \hat{f}$$ Eq. 13 representing the distance from the starting point to the projected phase point. For example, referring again to FIG. 8, the distance parameter $t^l$ represents the distance from starting point 808 to projected phase point 810 along line 802. Minimizing this distance parameter will provide a determined minimum distance 806 ($D^l$) for noisy point 804. In other examples, any other suitable minimization process can be used to find a determined minimum distance.

The square distances provided by Eq. 11 provide a vector $\vec{D}^2 = \{D^{1^2}, D^{2^2}, \ldots, D^{L^2}\}$ containing the distances between the total phase and the line. The determined minimum distance provides a determined most likely set of phase orders. For example, if determined minimum distance 806 is a smallest value of the square distances vector, then the phase order set associated with noisy point 804 is selected as the most likely phase order set.

Given the most likely phase order set obtained via the distance minimization method, the optimal distance for the pixel can be assessed as a weighted sum of the projected phase or as the total phase. For example, the optimal distance d can be assessed as:

$$d = \begin{cases} (t^l \hat{f}) \hat{f}^l \\ [\vec{\phi} + 2\pi \vec{n}^l] \dfrac{f^2(k)}{\|\vec{f}\|^2} \end{cases} \qquad \text{Eq. 14}$$

where $t^l \hat{f}$ is the projected phase and $\vec{\phi} + 2\pi \vec{n}^l$ is the total phase of the noisy point associated with the most likely phase order vector $\vec{n}^l$.

An alternative implementation may be used when the number of frequencies (K) is either 3 or 7. In these cases, it is possible to determine the distance directly as the norm of the cross product of the total phase and frequency vector:

$$D^{l^2} = \left\| \vec{\phi}^l \times \hat{f} \right\| \qquad \text{Eq. 15}$$

where $D^{l^2}$ is the square distance, $\vec{\phi}^l$ is the noisy total phase and $\hat{f}$ is the normalized frequency vector. This implementation may be more efficient that those described above in the case of 3 or 7 frequencies.

Figure 9:
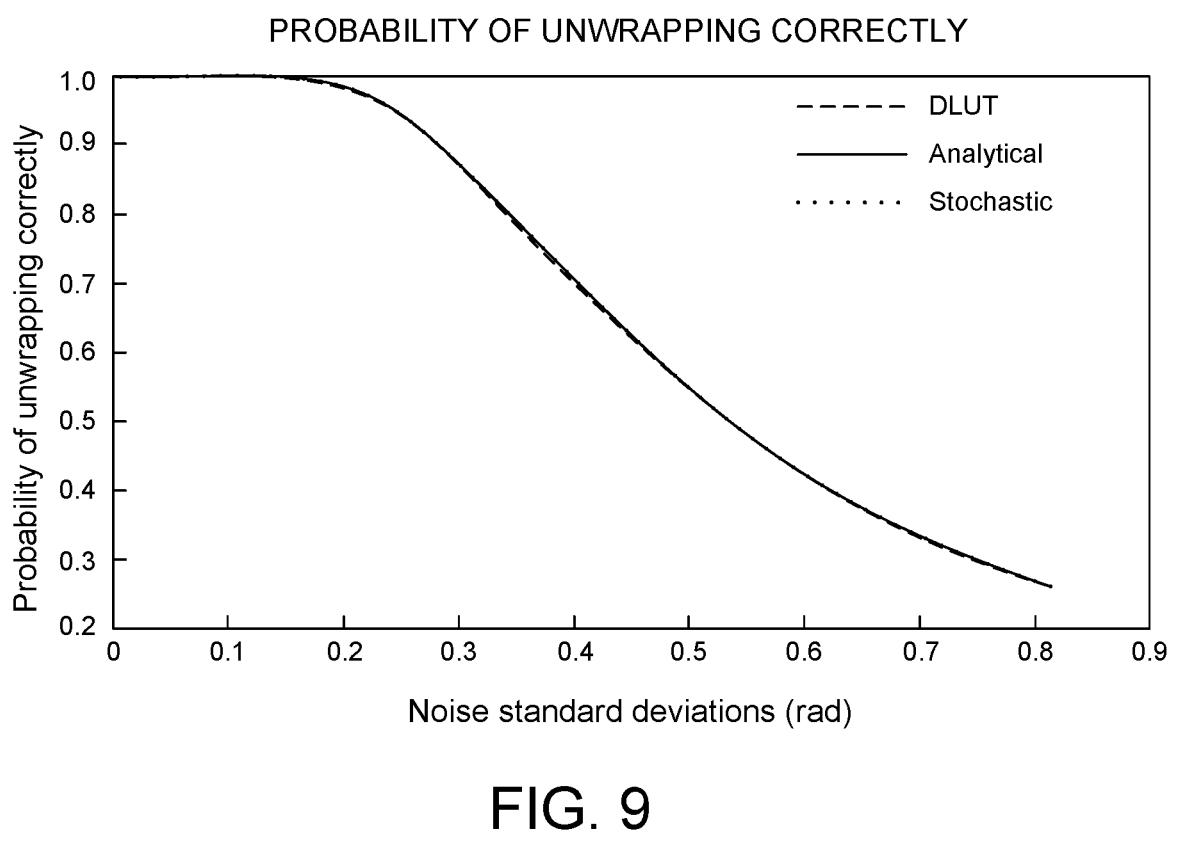

FIG. 9 illustrates modeled performance of the above algorithms compared to a dealiasing look-up table (DLUT) method (shown in dashed line). The probability of unwrapping correctly is shown as a solid line for the analytical method (see FIG. 5) and as a dotted line for the stochastic method (see FIG. 6). In this study, distance is used as an error function (see FIG. 8). The noise is isotropic Gaussian noise, with variances ranging from 0 to 0.67 $\text{rads}^2$ (std. dev.=0.82 rads~46.8 degrees), with 10 trials per distance. The range of unambiguity was sampled with an interval of 1 mm, and the image size is 512×512. An unwrapping error was considered when the distance between the unwrapped and reference is greater than 300 mm. As seen in FIG. 9, a phase unwrapping algorithm that compares total phase points to a line corresponding to the frequencies may achieve improved efficiency with similar performance to DLUT.

Figure 10:
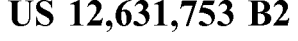
FIG. 10 shows a graph depicting an example series of parallel lines corresponding to different phase order sets, and schematically illustrates an example process of selecting a line based upon proximity to a point corresponding to a phase measurement.

In the examples above, points representing phase order sets are compared to a line representing phase evolution compared to distance. In other examples, phase order sets can be represented as a series of parallel lines, where each line corresponds to a distance range represented by a phase order set. FIG. 10 illustrates an example of such a graph at 1000. With such a representation, a phase order set can be selected by selecting a determined closest line to a point representing a set of phase measurements comprising a measurement made at each frequency. First, consider the remainder of the operation of R (Eq. 4 and 5) modulo $2\pi$. Let $\vec{f} = a\vec{m}$, where a is the greatest common divisor of the frequency vector and also the beat frequency that determines the range of unambiguity, and $\vec{m}$ is the coprime frequency vector. FIG. 10 shows an example of the resulting series of parallel lines that, in the case that the frequencies are not co-prime, have a range of unambiguity. In that range, the number of lines L is the sum of the co-primes frequencies:

$$L = \sum_{k=1}^{K} m(k) \qquad \text{Eq. 16}$$

where m(k) are the elements of the co-prime frequency vector $\vec{m}$. The resulting L lines correspond to the phase order sets $\vec{n}^l$ previously described above.

In graph 1000, each parallel line has a slope corresponding to $\vec{f} = \{198, 189, 54\}$ MHz for the range of unambiguity. Furthermore, each line corresponds to a different phase order set. As discussed above, the phases evolve linearly with the distance, leading to L parallel lines ($R^l$) in the K-dimensional space. The lines are given by:

$$R^l \equiv \vec{\phi}_0^l + t\hat{f} \qquad \text{Eq. 17}$$

where $$\vec{\phi}_0^l$$

are the starting points and $\hat{f}$ is the slope.

In the noise-free case, the problem is determined by the set of lines in FIG. 10 $\vec{R} = \{R^1, R^2, \ldots, R^L\}$. However, when noise is involved, then circularity (wrap around) needs to be evaluated. For example, where an actual distance is located close to either end of one of the lines $R^L$, then noise may result in the measurement appearing in a different phase order set. FIG. 10 illustrates this. Initially, a noise free phase point 1002 for 750 mm is calculated as $\vec{\phi} = \{6.225, 5.942, 1.698\}$. When noise is added (random noise of variance 0.04 $\text{rads}^2$ in this example), point 1002 is transformed into $\vec{\phi} = \{0.113, 5.634, 1.964\}$, denoted by phase point 1004.

To address this noise issue, in one example, a method of line addition is employed to add extra lines (e.g., dashed lines of FIG. 10) to provide a minimum distance that is smaller than the distance in between the parallel lines (analogous to Voronoi cells in a lattice), wherein each extra line (e.g., line 1020) represents a continuation of a phase order line as if it extended beyond a phase wrapping point. The extra lines are lines that would result from mathematically feasible phase orders or wraps. For a cell in K-dimensional space there will be $3^K-1$ neighboring cells that need to be considered. For example, in the two-frequency case (K=2), the set of parallel lines lie inside a square. As such, in order to cover all possibilities, the surrounding 8 squares would be added. Thus 8 times the number of lines are added. In the case of three frequencies (K=3), there are 26 neighboring cells, implying to add 26 times the number of lines. The dashed lines in FIG. 10 represent added lines from one such neighboring cell. However, most of the lines would not be able to be reached, as wrapping would prevent a measurement from being proximate to most lines.

Thus, to reduce a number of additional lines to be generated, a stochastic method can be utilized. Starting points of the lines that are likely to be used by the data $$\vec{\Phi}_0 = \left\{ \vec{\phi}_0^1, \vec{\phi}_0^2, \dots, \vec{\phi}_0^l \right\}$$

can be generated as follows. First, a range of interest may be fine sampled (the resolution of the sampling is smaller than the jitter introduced by the noise) and the phase vectors ($\vec{\phi}(d)$) provided via Eq. 3. Once the reference phase vector is provided $\vec{\phi}(d)$ for the points on the range of interest, random noise, compatible with the noise generated by the sensor, is added to generate a noisy phase vector. As described above, the noise may be isotropic or anisotropic.

Distances from the noisy point to the lines in the graph are evaluated using the methods described above, e.g., Eqs. 11-14. The line corresponding to a determined minimum distance is selected, from which a most likely phase order is determined. As shown in FIG. 10, phase point 1002 is closest to line 1010. As such, line 1010 is selected from the series of lines 1000. The phase order set corresponding to the selected line 1010 is then determined to be the most likely phase order set of those considered. Finally, the optimal distance for the pixel is determined from the most likely phase order set, as described above. In some examples, a set of lines comprising lines for which the distance is smaller than half of the distance between the parallel lines are considered. The procedure of repeated noise additions may be repeated any number of times to be able to check all possible combinations of sets of phase orders that result from the stochastic process. Then, unique starting points are selected for the additional lines.

As another example, instead of computing stochastic starting points for additional lines, a circularity check is performed to check whether a phase point may be wrapped. If a phase point $\vec{\phi}$ is wrapped around, a distance regarding to the line set $\vec{R}$ may be comparatively large. Thus, a threshold can be fixed before investigating a point for circularity $\vec{\phi}^c$. This investigation may be performed by checking the possible combinations that the phase can be wrapped around. For instance, for two frequencies there are eight possible combinations, and for three frequencies there are 27 combinations. To avoid checking all possible combinations, a threshold for the maximum variance error allowed can be assigned (th). Then, if a phase from a frequency is smaller than the threshold ($\tilde{\phi}_k <$ th) or over a superior threshold ($2\pi - \tilde{\phi}_k >$ th), it will be checked. A point may be transformed into one of the possible circular combinations using:

$$\tilde{\phi}_k^c = 2\pi - \tilde{\phi}_k \qquad \text{Eq. 18}$$

where $\tilde{\phi}_k$ is a measured phase of the phase point for frequency k.

FIG. 10 depicts an example of a circularity check. As described above, added noise transformed phase point 1002 into phase point 1004. After a circularity check is performed, phase point 1004 is transformed via Eq. 18 into $\vec{\phi}^c$={6.171, 5.634, 1.964} represented by phase point 1006.

Figure 11:
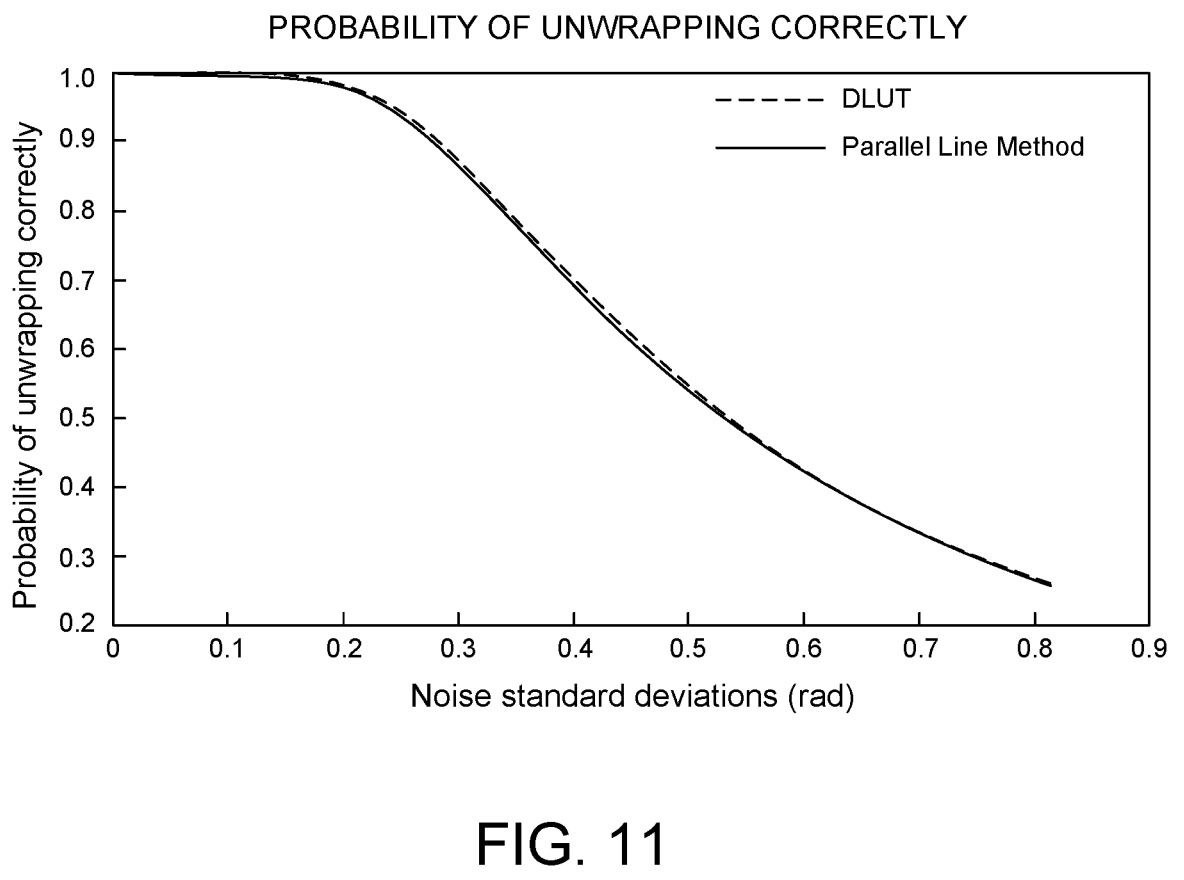

FIG. 11 illustrates a modeling of the performance of a distance determination using multiple parallel lines, each representing a phase order set, compared to DLUT (dashed lined). The modeled algorithm uses circularity checking to account for noise at wrapping locations. The noise is isotropic Gaussian noise, with variances ranging from 0 to 0.67 $rads^2$ (SD=0.82 rads~46.8 degrees), with 10 trials per distance. The range of unambiguity is sampled with an interval of 1 mm and the image size is 512×512. An unwrapping error was considered when the distance between the unwrapped and the reference line is greater than 300 mm. Compared to DLUT, the algorithm may be more efficient, yet achieve similar performance.

In addition to the single line and multiple parallel line examples described above, other example unwrapping methods can be based on a minimization of the distance to intersection points of straight lines that relate distance with phase. Such an example may be used for a manifold of frequencies, and scales linearly.

In such an example, the slopes of the straight lines are related to the modulation frequencies, and the intersection points are determined based on the phase measurements. First, slopes and independent terms of the straight lines per frequency for the unambiguity range ($d_u$) are calculated from the wrapping distance of the greatest common divisor $$d_u = \frac{c}{2 gcd(\{f\})},$$

as shown in FIG. 4. The slopes $d_k$ for straight lines per frequency ($k \in \{1, 2, \dots, K\}$) are calculated according to:

$$d_k = m_k \phi_k + n_k^N \qquad \text{Eq. 19}$$

where $\phi_k$ is the phase measurement for frequency $$k, m_k = \frac{c}{4\pi f_k} \text{ and } n_k^N = \frac{cN}{2 f_k}, \text{ with } N \in \left\{ 0, 1, \dots \text{ floor} \left( \frac{f_k}{gcd(f)} \right) \right\}.$$

Figure 12:
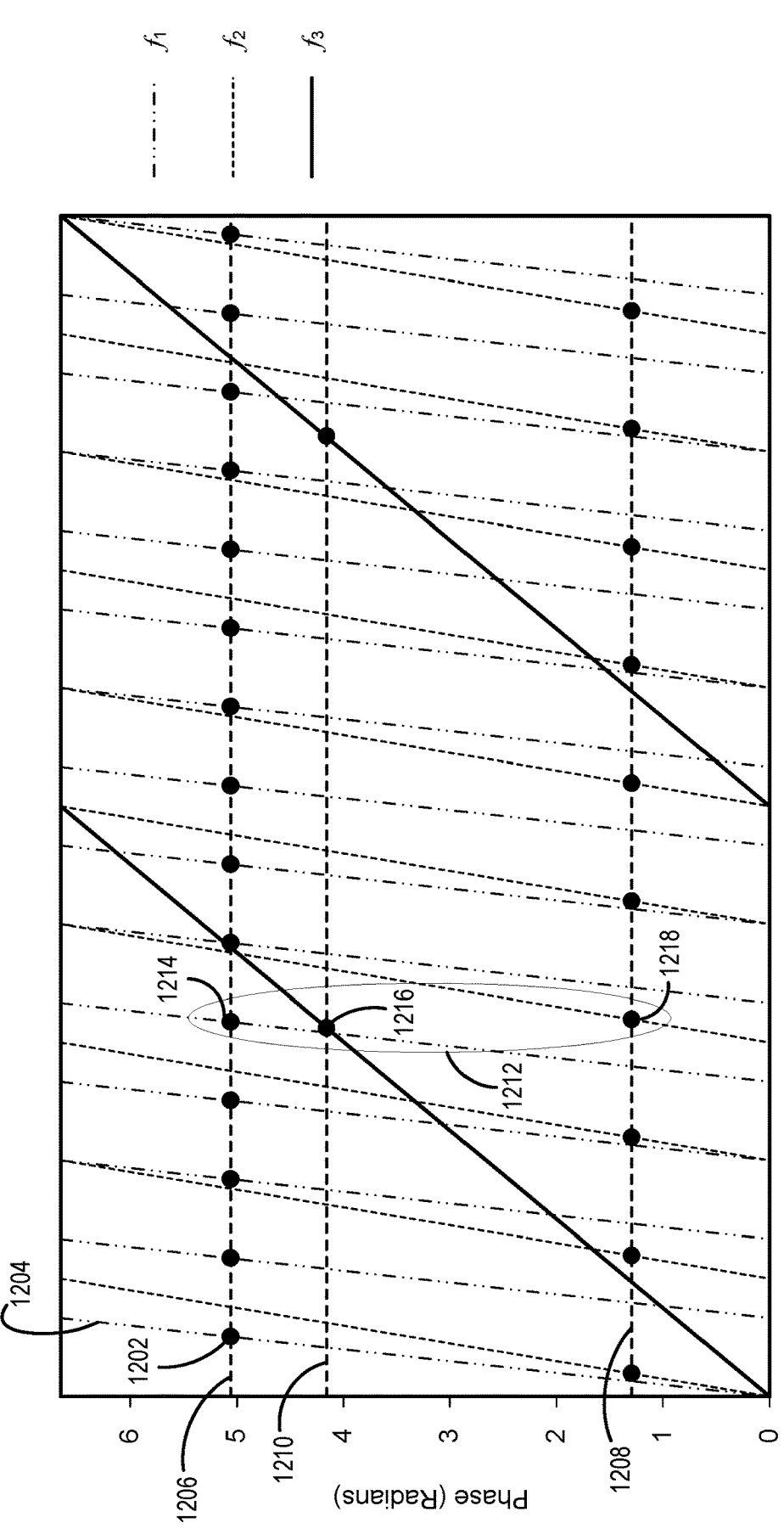
FIG. 12 shows an example method of finding intersection points in the graph of FIG. 4 based on phase measurements, and selecting a most likely set of intersection points based on a determined minimum inter-distance.
Figure 13:
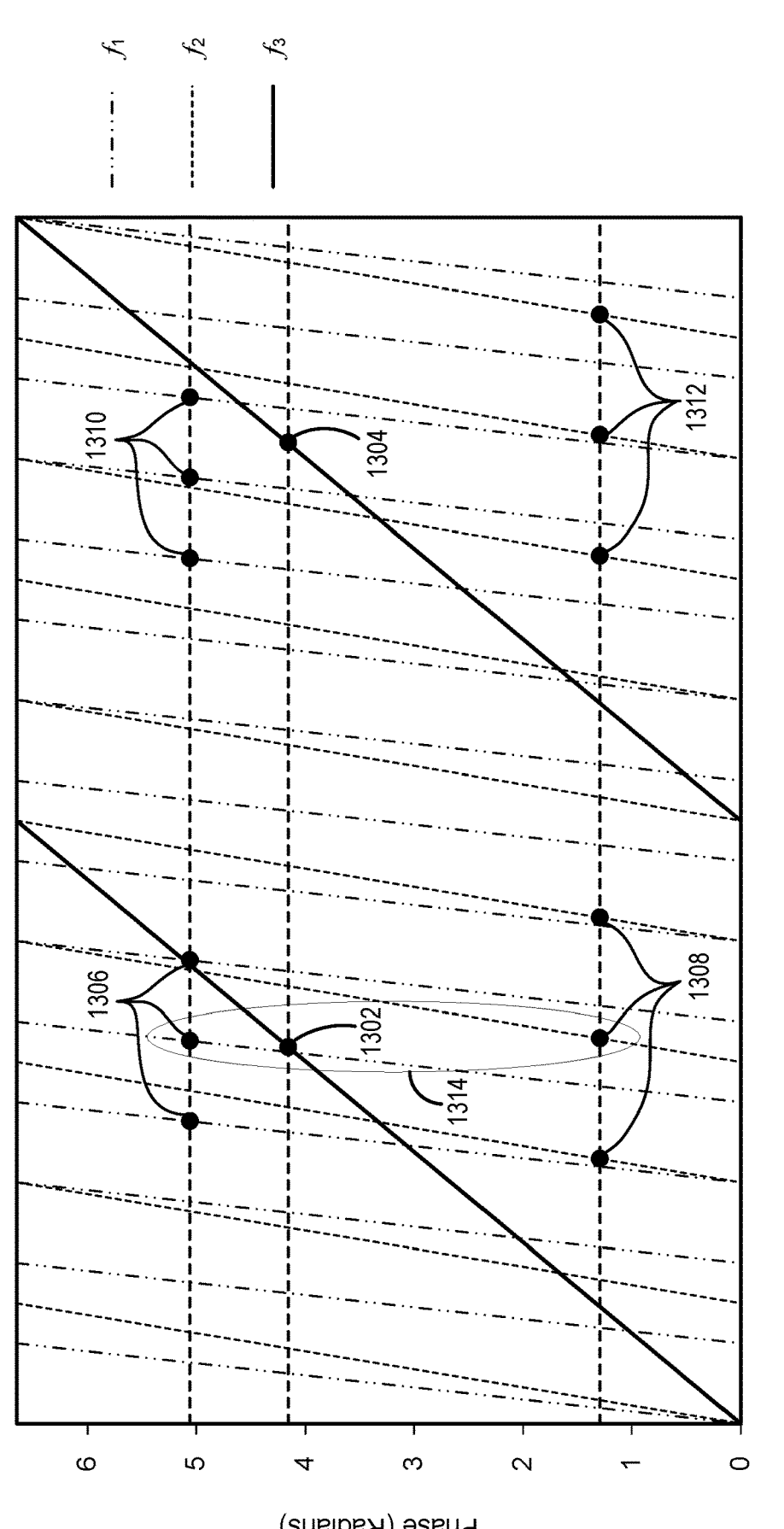
FIG. 13 shows another example method of finding intersection points in the graph of FIG. 4, where possible intersection points of higher frequencies are chosen based on intersection points of the lowest frequency.

For example, the slopes of the lines in FIGS. 4, 12, and 13 are calculated according to Eq. 19.

Intersection points of horizontal lines representing phase measurements with diagonal lines representing a relationship between phase and distance for different frequencies can be found using any suitable method. In one example implementation, as shown in FIG. 12, all the intersection points are found, wherein each intersection point represents an intersection of phase a measurement $\phi_k$ with a line representing distance v. phase for a frequency ($f_1$, $f_2$, $f_3$). For example, intersection point 1202 is located at the intersection between the first wrapping line 1204 for frequency $f_1$ and the corresponding phase measurement $\phi_1$ indicated by line 1206. Each measurement line may intersect the phase v. distance lines for each frequency multiple points due to wrapping, depending upon a distance range of interest. As shown in FIG. 12, there are 15 intersection points between measurement 1206 and the lines generated from frequency $f_1$, 12 intersection points between measurement 1208 and frequency $f_2$, and 2 intersection points between measurement 1210 and the lines generated from frequency $f_3$.

From the collection of intersection points, a set of intersection points (one point from each frequency measurement)

having a minimum inter-distance is found, the set corresponding to the most likely phase order set, where the inter-distance corresponds to the difference in the distance values of the intersection points. For example, the three intersection points in the set 1212 (black oval) may be determined to have minimum inter-distance due to the relatively smaller differences between the distance values (x-axis) of intersection points 1214, 1216, and 1218 compared to other sets of intersection points. From set 1212, an average distance may be computed. In other examples, in the case of K frequencies, a set of K points having minimum inter-distance is determined, one point corresponding to each of the K frequencies, and an average distance value is computed therefrom.

In another example, a subset of intersection points are considered, and can be found using intersections of a selected frequency, e.g. a lowest frequency. FIG. 13 graphically shows a process of selecting a set of intersection points having minimum inter-distance, where intersection points corresponding to higher frequencies are selected based on the lowest frequency intersection points. The measurement line and slope lines associated with the lowest frequency $f_3$ intersect at intersection points 1302 and 1304. Intersection points within the unambiguity range for the higher frequencies are then determined. The obtained distances for the lower frequency intersection points are transformed onto wrapping orders for the other frequencies according to:

$$N_{k \neq i} = \frac{4\pi d_i}{c} f_k \qquad \text{Eq. 20}$$

where $N_k$ is the wrapping order of a higher frequency $f_k$ and $d_i$ is the distance of an intersection point corresponding to a lower frequency $f_i$. The intersection points of this order ($N_k$), one above, and one below are considered. However, intersection points outside the range of unambiguity may be ignored. For example, in FIG. 13, Eq. 20 is applied to determine intersection points for frequencies $f_1$ and $f_2$, based on the distance of intersection points for frequency $f_3$. The obtained distance of intersection point 1302 is used to determine the wrapping order for frequencies $f_1$ and $f_2$, from which intersection points 1306 and 1308 are chosen for frequencies $f_1$ and $f_2$, respectively. Likewise, intersection points 1310 and 1312 are also chosen, based on the distance of intersection point 1304.

In this manner, a set of intersection points having a minimum inter-distance is determined, wherein the set corresponds to a determined most likely phase order set. The phase order set comprises one point associated with each frequency measurement. For example, referring again to FIG. 13, one point from intersection points 1302, 1304, one point from intersection points 1306, 1310, and one point from intersection points 1308, 1312 are chosen, and the distance (depth value) is determined therefrom. For example, where set 1314 (enclosed with an oval) is determined to have the minimum inter-distance, the average distance for the phase measurements gives the most likely distance value. As fewer intersection points are considered in FIG. 13 as compared to FIG. 12, the process depicted in FIG. 13 may be more efficient in determining distance values.

FIG. 14 is a flowchart illustrating an example method 1400 for determining a depth value for a ToF pixel. At 1402, the method comprises making two or more phase measurements, each phase measurement corresponding to a different modulation frequency of two or more modulation frequencies. In some examples, at 1404, the two or more modulation frequencies comprise K modulation frequencies.

Method 1400 further comprises, at 1406, based at least on the two or more phase measurements, determining a series of phase order sets, each phase order set comprising a phase order for each frequency of the two or more frequencies.

In some examples, determining the phase order sets is done according to:

$$n_i = \text{round}\left[\frac{\left|\left(\tilde{\phi}_k + 2\pi n_k^l\right)\frac{f_i}{f_k} - \tilde{\phi}_i\right|}{2\pi}\right], i \neq k$$

wherein $n_i$ is a phase order for frequency $f_i$ of a phase order set $\vec{n}^l$, $\tilde{\phi}_i$ is a phase measurement corresponding to frequency $f_i$, $$n_k^l$$

is a phase order for frequency $f_k$ of the phase order set $\vec{n}^l$, and $\tilde{\phi}_k$ is a phase measurement corresponding to a different frequency $f_k$. In some examples, the method comprises determining phase order sets $\vec{N} = \{\vec{n}^1, \vec{n}^2, \ldots \vec{n}^L\}$ by generating a noisy phase vector from a reference phase vector, and calculating phase order vectors from the noisy phase vector according to:

$$\vec{n}^l = \text{floor}\left[\frac{\vec{\phi}(d)}{2\pi}\right]$$

wherein $\vec{n}^l$ is a phase order set of the series of phase order sets and $\vec{\phi}(d)$ is the noisy phase vector. In some such examples, the method comprises generating the noisy phase vector by adding random noise for each of a plurality of points along the reference phase vector. Additionally or alternatively, the method may comprise generating the noisy phase vector by adding anisotropic noise comprising a frequency-dependent variance.

Method 1400 further comprises, at 1408, determining a determined most likely phase order set by comparing the series of phase order sets to a line representing an evolution of phase with distance. In some examples, the method comprises, at 1410, maximizing a cosine of an angle between a frequency vector and a second vector comprising the phase order set. In some such examples, the method further comprises calculating a distance according to:

$$D^{l^2} = \left\| \vec{\tilde{\phi}}^l - t^l \hat{f} \right\|^2$$

wherein $D^{l^2}$ is the distance, $\vec{\tilde{\phi}}^l$ is a total phase of the phase measurements, $\hat{f}$ is a slope of a frequency vector comprising the modulation frequencies, and $t^l$ is a parameter corresponding to a projected phase point $t^l \hat{f}$. In some examples, wherein the number of frequencies is either 3 or 7, the distance is calculated according to:

$$D^{l^2} = \left\| \vec{\hat{\phi}}^l \times \hat{f} \right\|$$

wherein $D^{l^2}$ is the square distance, $\vec{\hat{\phi}}^l$ is a total phase of the phase measurements, and $\hat{f}$ is a slope of a frequency vector comprising the modulation frequencies.

In some examples, instead of performing process 1410, method 1400 may comprise, at 1412, minimizing a distance between a point representing the phase order and the frequency vector. In some examples, at 1414, the line is a frequency vector in K-dimensional space, the frequency vector comprising K modulation frequencies. The method further comprises, at 1416, based on the most likely phase order set, determining a distance value associated with the pixel.

FIG. 15 shows another flowchart illustrating an example method 1500 for determining a depth value for a ToF pixel. The method comprises, at 1502, making K phase measurements, each phase measurement corresponding to a different modulation frequency.

Method 1500 further comprises, at 1504, determining a most likely phase order set based at least on a distance in K-dimensional space from a point representing the K phase measurements to a selected line of a set of parallel lines, each parallel line corresponding to a different phase order. In some examples, the method comprises, at 1506, determining the set of parallel lines by replicating an initial set of parallel lines, the initial set of parallel lines comprising lines within an initial cell in K-dimensional space, the replicating comprising translating the initial set of parallel lines to $3^K-1$ cells that neighbor the initial cell in K-dimensional space. In some examples, the set of parallel lines has plurality L and the method comprises determining the set of L parallel lines according to:

$$L = \mathrm{mod}(R, 2\pi)$$

wherein $R \equiv t\hat{f}$ for parameter t and slope $\hat{f}$ in K-dimensional space. The method may additionally or alternatively comprise determining the set of L parallel lines according to:

$$R^l = \vec{\hat{\phi}}_0^l + t\hat{f}$$

wherein $R^l$ is a line l of the L parallel lines and $$\vec{\hat{\phi}}_0^l$$

is the starting point of the line corresponding to the phase order set.

In some examples, the method comprises determining an initial set of parallel lines and generating a plurality of noisy phase vectors from the K modulation frequencies. In such examples, determining the set of parallel lines comprises selecting lines from the initial set of parallel lines based on a distance from each line of the initial set of parallel lines to each phase vector of the plurality of noisy phase vectors.

In some examples, at 1508, method 1500 comprises adding noise to a noise-free point representing the K phase measurements to obtain one or more noisy points, and determining the selected line based on distances from the one or more noisy points to the selected line. In some examples, at 1510, the method comprises transferring a noisy point of the one or more noisy points around a wrapping point.

Method 1500 further comprises, at 1512, based on the most likely phase order set determined, determining a distance value associated with the pixel.

FIG. 16 is another flowchart illustrating an example method 1600 for determining a depth value for a ToF pixel. At 1602, the method comprises receiving a plurality of phase measurements, each phase measurement associated with a different modulation frequency of amplitude modulated light. Method 1600 further comprises, at 1604, determining one or more lines for each modulation frequency, each line having a slope corresponding to a distance versus phase for each wrapping of the modulation frequency. The slope of the lines may be determined using Eq. 19, for example.

Method 1600 further comprises, at 1606, for each phase measurement of the plurality of phase measurements, determining one or more intersection points each based on an intersection of a line of the one or more lines with a value of the phase measurement, each intersection point corresponding to a phase order of the modulation frequency associated with the phase measurement. For example, each intersection point in FIG. 12 corresponds to a different phase order of its respective frequency. In some examples, at 1608, determining the one or more intersection points for a higher frequency is based on intersection points for a lower frequency, as discussed above regarding FIG. 13. This may be performed by transforming obtained distances for lower frequency intersection points onto wrapping orders for higher frequencies using Eq. 20, as shown at 1610.

In some examples, the method comprises, for each phase measurement of the plurality of phase measurements, determining a distance value for each intersection point according to:

$$d_k = m_k \phi_k + n_k^N$$

wherein $d_k$ is the distance value for the intersection point for line corresponding to phase order $$n_k^N$$

and frequency k with $k \in \{1, 2 \ldots K\}$, K being the number of frequencies, $\phi_k$ is the value of the phase measurement, $$m_k = \frac{c}{4\pi f_k},$$

c is the speed of light, $f_k$ is the modulation frequency of frequency k, $$n_k^N$$

US 12,631,753 B2

19 is calculated as $$n_k^N = \frac{cN}{2f_k} \text{ with } N \in \left\{0, 1, \dots, \text{floor}\left(\frac{f_k}{gcd(f)}\right)\right\};$$

and wherein the minimum inter-distance is determined based upon the distance value for each intersection point.

Method 1600 further comprises, at 1612, selecting a most likely phase order set corresponding to a set of intersection points based on a lowest determined inter-distance determined between the set of intersection points, the set of intersection points comprising an intersection point for each phase measurement of the plurality of phase measurements. Method 1600 further comprises, at 1614, based on the most likely phase order set, determining a depth value for the ToF pixel.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
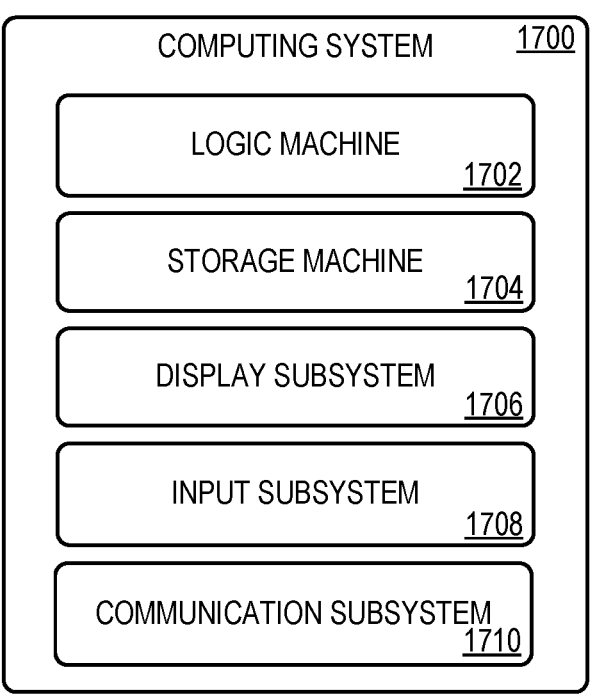
FIG. 17 shows a block diagram of an example computing system.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices including those depicted in FIG. 1.

Computing system 1700 includes a logic machine 1702 and a storage machine 1704. Computing system 1700 may optionally include a display subsystem 1706, input subsystem 1708, communication subsystem 1710, and/or other components not shown in FIG. 17.

Logic machine 1702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. Logic machine 1702 may comprise controller 208 of FIG. 2.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1704 includes one or more physical devices configured to hold instructions executable by the logic machine to implement the methods and processes described herein (e.g., methods 1400, 1500, and 1600). When such methods and processes are implemented, the state of storage machine 1704 may be transformed—e.g., to hold different data.

Storage machine 1704 may include removable and/or built-in devices. Storage machine 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1704 may include volatile, nonvolatile, dynamic, static, read/write, read-only, random-access, sequential-access, location-addressable, file-addressable, and/or content-addressable devices.

It will be appreciated that storage machine 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1702 and storage machine 1704 may be integrated together into one or more hardware-logic components. Such hardware-logic components may include field-programmable gate arrays (FPGAs), program- and application-specific integrated circuits (PASIC/ASICs), pro-gram- and application-specific standard products (PSSP/ASSPs), system-on-a-chip (SOC), and complex program-mable logic devices (CPLDs), for example.

When included, display subsystem 1706 may be used to present a visual representation of data held by storage machine 1704. For example, display subsystem 1706 may be used to display a depth image. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic machine 1702 and/or storage machine 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or inter-face with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (e.g., depth imaging system 200) for machine vision and/or ges-ture recognition; a head tracker, eye tracker, accelerometer, and/or gyroscope for motion detection and/or intent recog-nition; as well as electric-field sensing componentry for assessing brain activity.

When included, communication subsystem 1710 may be configured to communicatively couple computing system 1700 with one or more other computing devices. Communi-cation subsystem 1710 may include wired and/or wireless communication devices compatible with one or more dif-ferent communication protocols. As non-limiting examples, the communication subsystem may be configured for com-munication via a wireless telephone network, or a wired or wireless local- or wide-area network. In some embodiments, the communication subsystem may allow computing system 1700 to send and/or receive messages to and/or from other devices via a network such as the Internet.

Another example provides a computing system, comprising a depth sensor comprising a plurality of pixels, each pixel configured to sense light, an illumination source configured to output light, a logic machine, and a storage machine holding instructions executable by the logic machine to control the illumination source to output amplitude-modulated light at two or more modulation frequencies and, for each pixel of the plurality of pixels, make two or more phase measurements, each phase measurement corresponding to a different modulation frequency of the two or more modulation frequencies, based at least on the two or more phase measurements, determine a series of phase order sets, each phase order set comprising a phase order for each frequency of the two or more frequencies, determine a most likely phase order set by comparing the series of phase order sets to a line representing an evolution of phase with distance, and based on the most likely phase order set, determine a distance value associated with the pixel. In some such examples, the instructions may be executable to determine the series of phase order sets according to $n_i$=round $$\left[\frac{\left|\left(\phi k + 2\pi n_k^l\right)\frac{f_i}{f_k} - \phi i\right|}{2\pi}\right],$$

$i{\neq}k$, wherein $n_i$ is a phase order for frequency $f_i$ of a phase order set $\vec{n}^l$, $\phi_i$ is a phase measurement corresponding to frequency $f_i$, $$n_k^l$$

is a phase order for frequency $f_k$ of the phase order set $\vec{n}^l$, and $\phi_k$ is a phase measurement corresponding to a different frequency $f_k$. In some such examples, the instructions may additionally or alternatively be executable to determine a series of phase order sets $\vec{N} = \{\vec{n}^1, \vec{n}^2, \ldots \vec{n}^L\}$ by generating a noisy phase vector from a reference phase vector, and calculating phase order vectors from the noisy phase vector according to $\vec{n}^l =$ $$\text{floor}\left[\frac{\vec{\tilde{\phi}}(d)}{2\pi}\right],$$

wherein $\vec{n}^l$ is a phase order set of the series of phase order sets and $\vec{\tilde{\phi}}$ (d) is the noisy phase vector. In some examples, the instructions may additionally or alternatively be executable to generate the noisy phase vector by adding random noise for each of a plurality of points along the reference phase vector. In some such examples, the instructions may additionally or alternatively be executable to generate the noisy phase vector by adding anisotropic noise comprising a frequency-dependent variance. In some examples, wherein two or more modulation frequencies comprises K modulation frequencies, the instructions may additionally or alternatively be executable to make K phase measurements corresponding to the K modulation frequencies, wherein the line is a frequency vector in K-dimensional space, the frequency vector comprising the K modulation frequencies. In some such examples, the instructions may additionally or alternatively be executable to determine the most likely phase order set by selecting a phase order set that maximizes a cosine of an angle between the frequency vector and a second vector comprising the phase order set. In some such examples, the instructions may additionally or alternatively be executable to determine the most likely phase order set by selecting a phase order set that minimizes a distance between a point representing the phase order and the frequency vector. In some such examples, the distance may additionally or alternatively be calculated according to $D^{l^2}=\|\vec{\phi}^l - t^l\hat{f}\|^2$, wherein $D^{l^2}$ is the distance, $\vec{\phi}^l$ is a total phase of the phase measurements, $\hat{f}$ is a slope of a frequency vector comprising the modulation frequencies, and $t^l$ is a parameter corresponding to a projected phase point $t^l\hat{f}$. In some such examples, wherein the number of frequencies is either 3 or 7, the distance may additionally or alternatively be calculated according to $D^{l^2}=\|\vec{\phi}^l{\times}\hat{f}\|$, wherein $D^{l^2}$ is the square distance, $\vec{\phi}^l$ is a total phase of the phase measurements, and $\hat{f}$ is a slope of a frequency vector comprising the modulation frequencies.

Another example provides a computing system comprising a depth sensor comprising a plurality of pixels, each pixel configured to sense light, an illumination source configured to output light, a logic machine, and a storage machine holding instructions executable by the logic machine to control the illumination source to output amplitude-modulated light at K modulation frequencies and, for each pixel of the plurality of pixels, make K phase measurements, each phase measurement corresponding to a different modulation frequency of the K modulation frequencies, K being greater than or equal to two, determine a most likely phase order set based at least on a distance in K-dimensional space from a point representing the K phase measurements to a selected line of a set of parallel lines, the set of parallel lines determined based on the K modulation frequencies, each parallel line in the set of parallel lines corresponding to a different phase order set comprising K phase orders, the selected line corresponding to the most likely phase order set, and based on the most likely phase order set determined, determine a distance value associated with the pixel. In some such examples, wherein the set of parallel lines has plurality L, the instructions may be executable to determine the set of L parallel lines according to L=mod(R, $2\pi$), wherein R≡t$\hat{f}$ for parameter t and slope $\hat{f}$ in K-dimensional space. In some such examples, the instructions may additionally or alternatively be executable to determine the set of L parallel lines according to $$R^l = \vec{\phi}_0^l + t\hat{f},$$

wherein $R^l$ is a line l of the L parallel lines and $$\vec{\phi}_0^l$$

is the starting point of the line corresponding to a phase order set. In some such examples, the instructions may additionally or alternatively be executable to determine the set of parallel lines by replicating an initial set of parallel lines, the initial set of parallel lines comprising lines within an initial cell in K-dimensional space, the replicating comprising translating the initial set of parallel lines to $3^K-1$ cells that neighbor the initial cell in K-dimensional space. In some such examples, the instructions may additionally or alternatively be executable to determine an initial set of parallel lines and generate a plurality of noisy phase vectors from the K modulation frequencies, wherein determining the set of parallel lines comprises selecting lines from the initial set of parallel lines based on a distance from each line of the initial set of parallel lines to each phase vector of the plurality of noisy phase vectors. In some such examples, the instructions may additionally or alternatively be executable to add noise to a noise-free point representing the K phase measurements to obtain one or more noisy points, and determine the selected line based on distances from the one or more noisy points to the selected line. In some such examples, the instructions may additionally or alternatively be executable to transfer a noisy point of the one or more noisy points around a wrapping point.

Another example provides a method of determining a depth value for a time-of-flight pixel, the method comprising receiving a plurality of phase measurements, each phase measurement associated with a different modulation frequency of amplitude modulated light, for each modulation frequency of the different modulation frequencies, determining one or more lines, each line having a slope corresponding to a distance versus phase for each wrapping of the modulation frequency, for each phase measurement of the plurality of phase measurements, determining one or more intersection points each based on an intersection of a line of the one or more lines with a value of the phase measurement, each intersection point corresponding to a phase order of the modulation frequency associated with the phase measurement, selecting a most likely phase order set corresponding to a set of intersection points based on a lowest determined inter-distance determined between the set of intersection points, the set of intersection points comprising an intersection point for each phase measurement of the plurality of phase measurements, and based on the most likely phase order set, determining a depth value for the time-of-flight pixel. In some such examples, the method may comprise, for a phase measurement associated with a higher frequency, determining the one or more intersection points is further based on intersection points for a lower frequency. In some examples, the method may additionally or alternatively comprise, for each phase measurement of the plurality of phase measurements, determining a distance value for each intersection point according to $$d_k = m_k \phi_k + n_k^N,$$

wherein $d_k$ is the distance value for the intersection point for line corresponding to phase order $$n_k^N$$

and frequency k with $k \in \{1, 2 \ldots K\}$, K being the number of frequencies, $\phi_k$ is the value of the phase measurement, $$m_k = \frac{c}{4\pi f_k},$$

c is the speed of light, $f_k$ is the modulation frequency of frequency k, $$n_k^N$$

is calculated as $$n_k^N = \frac{cN}{2 f_k} \text{ with } N \in \left\{0, 1, \ldots, \text{floor}\left(\frac{f_k}{gcd(f)}\right)\right\},$$

and wherein the minimum inter-distance is determined based upon the distance value for each intersection point.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a depth sensor comprising a plurality of pixels, each pixel configured to sense light;
an illumination source configured to output light;
a logic machine; and
a storage machine holding instructions executable by the logic machine to control the illumination source to output amplitude-modulated light at two or more modulation frequencies and, for each pixel of the plurality of pixels:
make two or more phase measurements, each phase measurement corresponding to a different modulation frequency of the two or more modulation frequencies,
based at least on the two or more phase measurements, determine a series of phase order sets $\vec{n}^1, \vec{n}^2, \vec{n}^l$ } by generating a noisy phase vector from a reference phase vector, and calculating phase order vectors from the noisy phase vector according to $$\vec{n}^l = \text{floor}\left[\frac{\vec{\phi}(d)}{2\pi}\right],$$

wherein $\vec{n}^l$ is a phase order set of the series of phase order sets and $\vec{\phi}(d)$ is the noisy phase vector, each phase order set comprising a phase order for each frequency of the two or more frequencies,
determine a most likely phase order set by comparing the series of phase order sets to a line representing an evolution of phase with distance, and
based on the most likely phase order set, determine a distance value associated with the pixel.

2. The computing system of claim 1, wherein the instructions are executable to generate the noisy phase vector by adding random noise for each of a plurality of points along the reference phase vector.

3. The computing system of claim 1, wherein the instructions are executable to generate the noisy phase vector by adding anisotropic noise comprising a frequency-dependent variance.

4. The computing system of claim 1, wherein the two or more modulation frequencies comprises K modulation frequencies, wherein the instructions are executable to make K phase measurements corresponding to the K modulation frequencies, and wherein the line is a frequency vector in K-dimensional space, the frequency vector comprising the K modulation frequencies.

5. The computing system of claim 4, wherein the instructions are executable to determine the most likely phase order set by selecting a phase order set that maximizes a cosine of an angle between the frequency vector and a second vector comprising the phase order set.

6. The computing system of claim 4, wherein the instructions are executable to determine the most likely phase order set by selecting a phase order set that minimizes a distance between a point representing the phase order and the frequency vector.

7. The computing device of claim 6, wherein distance is calculated according to:

$$D^{l2} = \left\| \vec{\phi}^{l} - t^{l}\hat{f} \right\|^{2}$$

wherein $D^{l2}$ is the distance, $\vec{\phi}^{l}$ is a total phase of the phase measurements, $\hat{f}$ is a slope of a frequency vector comprising the modulation frequencies, and $t^{l}$ is a parameter corresponding to a projected phase point $t^{l}\hat{f}$.

8. The computing system of claim 6, wherein the number of frequencies is either 3 or 7, and wherein the distance is calculated according to:

$$D^{l2} = \left\| \vec{\phi}^{l} \times \hat{f} \right\|$$

wherein $D^{l2}$ is the square distance, $\vec{\phi}^{l}$ is a total phase of the phase measurements, and $\hat{f}$ is a slope of a frequency vector comprising the modulation frequencies.

9. A computing system comprising:
a depth sensor comprising a plurality of pixels, each pixel configured to sense light;
an illumination source configured to output light;
a logic machine; and
a storage machine holding instructions executable by the logic machine to control the illumination source to output amplitude-modulated light at K modulation frequencies and, for each pixel of the plurality of pixels:
make K phase measurements, each phase measurement corresponding to a different modulation frequency of the K modulation frequencies, K being greater than or equal to two,
determine a most likely phase order set based at least on a distance in K-dimensional space from a point representing the K phase measurements to a selected line of a set of parallel lines, the set of parallel lines determined based on the K modulation frequencies, each parallel line in the set of parallel lines corresponding to a different phase order set comprising K phase orders, the selected line corresponding to the most likely phase order set, and
based on the most likely phase order set determined, determine a distance value associated with the pixel.

10. The computing system of claim 9, wherein the set of parallel lines has plurality L, and wherein the instructions are executable to determine the set of L parallel lines according to:

$$L = \mathrm{mod}(R, 2\pi)$$

wherein $R = t\hat{f}$ for parameter t and slope $\hat{f}$ in K-dimensional space.

11. The computing system of claim 10, wherein the instructions are further executable to determine the set of L parallel lines according to:

$$R^{l} = \vec{\phi}_{0}^{l} + t\hat{f}$$

wherein $R^{l}$ is a line l of the L parallel lines and $$\vec{\phi}_{0}^{l}$$

is the starting point of the line corresponding to a phase order set.

12. The computing system of claim 9, wherein the instructions are executable to determine the set of parallel lines by replicating an initial set of parallel lines, the initial set of parallel lines comprising lines within an initial cell in K-dimensional space, the replicating comprising translating the initial set of parallel lines to $3^{K}-1$ cells that neighbor the initial cell in K-dimensional space.

13. The computing system of claim 9, wherein the instructions are further executable to determine an initial set of parallel lines and generate a plurality of noisy phase vectors from the K modulation frequencies, and
wherein determining the set of parallel lines comprises selecting lines from the initial set of parallel lines based on a distance from each line of the initial set of parallel lines to each phase vector of the plurality of noisy phase vectors.

14. The computing system of claim 9, wherein the instructions are further executable to add noise to a point representing the K phase measurements to obtain one or more noisy points, and determine the selected line based on distances from the one or more noisy points to the selected line.

15. The computing system of claim 14, wherein the instructions are executable to transfer a noisy point of the one or more noisy points around a wrapping point.

16. A computing system, comprising:
a depth sensor comprising a plurality of pixels, each pixel configured to sense light;
an illumination source configured to output light;
a logic machine; and
a storage machine holding instructions executable by the logic machine to control the illumination source to output amplitude-modulated light at two or more modulation frequencies and, for each pixel of the plurality of pixels:

make two or more phase measurements, each phase measurement corresponding to a different modulation frequency of the two or more modulation frequencies, based at least on the two or more phase measurements, determine a series of phase order sets according to:

$$n_i = \text{round}\left[\frac{\left|(\tilde{\phi}_k + 2\pi n_k^l)\frac{f_i}{f_k} - \tilde{\phi}_i\right|}{2\pi}\right], i \neq k$$

wherein $n_i$ is a phase order for frequency $f_i$ of a phase order set $\vec{n}^l$, $\tilde{\phi}_i$ is a phase measurement corresponding to frequency $f_i$, $$n_k^l$$

is a phase order for frequency $f_k$ of the phase order set $\vec{n}^l$, and $\tilde{\phi}_k$ is a phase measurement corresponding to a different frequency $f_k$, each phase order set comprising a phase order for each frequency of the two or more frequencies, determine a most likely phase order set by comparing the series of phase order sets to a line representing an evolution of phase with distance, and based on the most likely phase order set, determine a distance value associated with the pixel.

17. The computing system of claim 16, wherein the two or more modulation frequencies comprises K modulation frequencies, wherein the instructions are executable to make K phase measurements corresponding to the K modulation frequencies, and wherein the line is a frequency vector in K-dimensional space, the frequency vector comprising the K modulation frequencies.

18. The computing system of claim 17, wherein the instructions are executable to determine the most likely phase order set by selecting a phase order set that maximizes a cosine of an angle between the frequency vector and a second vector comprising the phase order set.

19. The computing system of claim 17, wherein the instructions are executable to determine the most likely phase order set by selecting a phase order set that minimizes a distance between a point representing the phase order and the frequency vector.

20. The computing device of claim 19, wherein distance is calculated according to:

$$D^{l^2} = \left\| \vec{\tilde{\phi}}^l - t^l \hat{f} \right\|^2$$

wherein $D^{l^2}$ is the distance, $\vec{\tilde{\phi}}^l$ is a total phase of the phase measurements, $\hat{f}$ is a slope of a frequency vector comprising the modulation frequencies, and $t^l$ is a parameter corresponding to a projected phase point $t^l\hat{f}$.

* * * * *